US009323595B2

(12) United States Patent
Yamada et al.

(10) Patent No.: US 9,323,595 B2
(45) Date of Patent: Apr. 26, 2016

(54) MICROCONTROLLER, CONTROL DEVICE AND DETERMINATION METHOD

(75) Inventors: Hiromichi Yamada, Hitachi (JP); Teruaki Sakata, Tokai (JP); Nobuyasu Kanekawa, Hitachi (JP); Yuichi Ishiguro, Kanagawa (JP); Takashi Yasumasu, Kanagawa (JP); Kazuyoshi Fukuda, Kanagawa (JP); Kesami Hagiwara, Kanagawa (JP)

(73) Assignee: Renesas Electronics Corporation, Tokyo (JP)

( * ) Notice: Subject to any disclaimer, the term of this patent is extended or adjusted under 35 U.S.C. 154(b) by 510 days.

(21) Appl. No.: 13/555,123

(22) Filed: Jul. 21, 2012

(65) Prior Publication Data
US 2013/0020978 A1 Jan. 24, 2013

(30) Foreign Application Priority Data

Jul. 21, 2011 (JP) .................................. 2011-159805

(51) Int. Cl.
*G05B 19/29* (2006.01)
*G06F 11/07* (2006.01)

(52) U.S. Cl.
CPC ........ *G06F 11/0754* (2013.01); *G06F 11/0739* (2013.01)

(58) Field of Classification Search
CPC .................................. F02D 45/00; H03K 7/06
USPC .......... 375/238; 327/3, 13, 26, 31, 35, 39, 48; 318/563, 400.13, 603
See application file for complete search history.

(56) References Cited

U.S. PATENT DOCUMENTS

| 5,787,132 | A | * | 7/1998 | Kishigami et al. | 375/354 |
| 6,421,382 | B1 | * | 7/2002 | Hayakawa | 375/238 |
| 6,538,484 | B1 | * | 3/2003 | Rappaport et al. | 327/172 |
| 7,260,319 | B2 | | 8/2007 | Watanabe et al. | |
| 7,509,206 | B2 | | 3/2009 | Sakurai et al. | |
| 7,694,163 | B1 | * | 4/2010 | Bisbee | G06F 1/189 323/243 |
| 7,791,386 | B2 | * | 9/2010 | Kris | 327/160 |
| 8,542,046 | B2 | * | 9/2013 | Roytman et al. | 327/175 |
| 2006/0009886 | A1 | * | 1/2006 | Sakurai et al. | 701/1 |
| 2006/0018636 | A1 | * | 1/2006 | Watanabe et al. | 388/804 |
| 2007/0288817 | A1 | * | 12/2007 | Tanaka et al. | 714/724 |

(Continued)

FOREIGN PATENT DOCUMENTS

| JP | 11-239055 A | 8/1999 |
| JP | 2004-339977 A | 12/2004 |

(Continued)

OTHER PUBLICATIONS

Office Action issued Nov. 27, 2014, in Japanese Application No. 2011-159805.

*Primary Examiner* — Eduardo Colon Santana
*Assistant Examiner* — Bickey Dhakal
(74) *Attorney, Agent, or Firm* — Shapiro, Gabor and Rosenberger, PLLC

(57) ABSTRACT

A microcontroller includes a central processing unit, a PWM signal generation unit which generates a PWM signal according to a generation condition of a PWM signal set by the central processing unit, and a diagnostic unit which inputs the generated PWM signal therein and detects a pulse period and a pulse width, based on the input signal and which determines whether the detected pulse period and pulse width respectively coincide with a pulse period and a pulse width corresponding to the generation condition.

18 Claims, 19 Drawing Sheets

(56) References Cited

U.S. PATENT DOCUMENTS

2009/0206780 A1* 8/2009 Hexamer ............... 318/400.02
2010/0131741 A1 5/2010 Yamada et al.

FOREIGN PATENT DOCUMENTS

| JP | 2006-042446 A | 2/2006 |
| JP | 2010-113388 A | 5/2010 |

* cited by examiner

MICROCONTROLLER, CONTROL DEVICE AND DETERMINATION METHOD

CROSS-REFERENCE TO RELATED APPLICATIONS

The disclosure of Japanese Patent Application No. 2011-159805 filed on Jul. 21, 2011 including the specification, drawings and abstract is incorporated herein by reference in its entirety.

BACKGROUND

The present invention relates to a microcontroller having a diagnostic function of a pulse width modulation (PWM) timer, a control device having the microcontroller built therein, and a determination method for determining whether the diagnostic function in the microcontroller is normal, and particularly to a technology effective if applied to a microcontroller having a PWM timer built therein, which needs to have higher reliability.

A microcontroller has been incorporated into each of devices such as a household electric appliance, an AV device, a cellular phone, an automobile and an industrial machine or the like. The microcontroller is of a semiconductor integrated circuit which performs processing in accordance with a program stored in a memory to thereby perform control on the respective devices. Parts including the microcontrollers incorporated into these devices need reliability according to their use. In the automobile, for example, there is a demand for the parts including the microcontrollers to have high reliability because there is a possibility that the breakdown of a control device can lead to accidents. For example, an automobile microcontroller needs to have the function of bringing a safety device into action to detect the occurrence of a breakdown when it has occurred and prevent the automobile from being brought to a dangerous condition. Therefore, the microcontroller needs to not only detect failures in, for example, a sensor, an actuator and the like target for control by performing diagnosis on those but also detect a failure in the microcontroller itself.

Related art technologies for detecting failures in electronic equipment have been disclosed in Patent Documents 1 through 3. The Patent Document 1 has disclosed a technology in which in a timer circuit, a process for a logical addition of a count value of a counter circuit in the timer circuit and an inverted value of an immediately preceding count value is performed, and a count operation is determined to be abnormal when its added value is "0 (zero)", after which the result of its determination is notified to the outside. The Patent Document 2 has disclosed a technology in which an automobile electronic control unit equipped with a microcontroller and an output driver circuit diagnoses earthing/powering and breaking of the output driver circuit, overcurrent of a power transistor and overtemperature of the power transistor. Further, the Patent Document 3 has disclosed a technology in which a microcontroller provided with a plurality of processing systems each comprised of a CPU and a memory compares data processed by the CPUs of the respective processing systems to detect abnormalities of the processing systems.

RELATED ART DOCUMENTS

Patent Documents

[Patent Document 1] Japanese Patent Laid-Open No. Hei 11 (1999)-239055

[Patent Document 2] Japanese Patent Laid-Open No. 2004-339977

[Patent Document 3] Japanese Patent Laid-Open No. 2010-113388

SUMMARY

The technologies of the Patent Documents 1 through 3 would have fully satisfied conventional reliability required for parts incorporated into the above devices. However, there has recently been a demand for further improvements in reliability and there is a high possibility that in the future also, reliability higher than now will be required. The inventors of the present application have therefore thought that a further technology for detailed fault diagnosis would be required.

Many motors have been used in automobiles, for example, and microcontrollers are used for their control. A PWM system is known as one of motor's drive control systems. In the PWM system, the microcontroller gives a pulse signal having a period enough shorter than the number of revolutions of the motor and its pulse width is changed to thereby control supply energy. For example, when a target value of energy to be supplied to a motor target for control is decided, a central processing unit (CPU) installed in a microcontroller calculates a pulse period and a pulse width of a PWM pulse signal corresponding to the target value and sets the calculated pulse period and pulse width to a register lying within a PWM timer installed in the microcontroller. Then, the PWM timer outputs a PWM pulse signal corresponding to the set values. In the microcontroller for the automobile, there is a need that one desires to examine whether the PWM pulse signal is correctly outputted. If the technology of the Patent Document 1 is applied to the automobile microcontroller with respect to this need, it is possible to detect an abnormality of a counter circuit in the PWM timer. The technology of the Patent Document 1 is however not capable of conducting inspections as to whether the pulse period and pulse width of the output PWM pulse signal being as set and the like and is insufficient as for failure inspection. The inventors of the present application have therefore studied about a method for diagnosing a failure in the PWM timer prior to the invention of the present application.

FIG. 19 is a block diagram showing one example of a microcontroller having a diagnostic function of a PWM timer studied by the inventors of the present application prior to the invention. In the microcontroller 200 shown in the same figure, the PWM timer 81 has a signal generation unit 82 which generates a PWM signal corresponding to a pulse period and a pulse width set by a CPU 11, and a pulse detection unit 83 which detects the rising and falling edges of the generated PWM signal. The signal generation unit 82 counts a clock signal CLK input from a clock generator (CPG) 16 by a counter (CNTR) 823. As the pulse period and pulse width set to a register (REG_PRD) 821 and a register (REG_PW) 822 of the signal generator 82, values to be compared with the count value of the counter 823 are set. A pulse generator (PG) 820 of the signal generator 82 generates and outputs a PWM signal 210, based on the count value of the counter 823 and the pulse period and pulse width set to each of the registers 821 and 822. The pulse detection unit 83 holds a count value at the time that the rising edge of the PWM signal 210 outputted from the signal generator 82 is detected, and a count value at the time that its falling edge is detected, in their corresponding registers 811 and 812. When the pulse detection unit 83 detects the rising edge, it causes an interrupt generator (INT_CNT) 813 to generate an interrupt signal and notifies it to the CPU 11. When the CPU 11 receives its notification, the CPU 11 accesses the registers 811 and 812 in the pulse detection unit 83 and thereby acquires a count value related to the rising edge and a count value related to the falling edge. Then, the CPU 11 calculates a pulse period and a pulse width, based on the acquired count values and determines whether the results of calculation coincide with the pulse period and pulse width set to the signal generation unit 82.

FIG. 20 is a block diagram showing another example of a microcontroller having a diagnostic function of a PWM timer examined by the inventors of the present application prior to the invention. The microcontroller 201 shown in the same drawing is different from the above microcontroller 200 of FIG. 19. A PWM timer 84 which generates a PWM signal, and a pulse detection unit 85 which detects the rising and falling edges of the generated PWM signal are configured as discrete circuit modules. The PWM timer 84 generates and outputs a PWM signal 211 by a method similar to the above signal generation unit 82. By a method similar to the above pulse detection unit 83, the pulse detection unit 85 holds a count value at the time that the rising edge of the PWM signal 211 is detected, and a count value at the time that the its falling edge is detected, in a register (REG_REDG) 811 and a register (REG_FEDG) 812 respectively. When the rising edge is detected, the pulse detection unit 85 generates an interrupt signal and notifies it to a CPU 11. Then, the CPU 11 calculates a pulse period and a pulse width, based on the acquired count values and determines whether the results of calculation coincide with the pulse period and pulse width set to the signal generation unit 84.

According to the microcontroller 200 shown in FIG. 19 and the microcontroller 201 shown in FIG. 20 as described above, it is possible to diagnose whether the pulse period and the pulse width of the PWM pulse signal generated by the PWM timer are as set. In the microcontrollers 200 and 201, however, the CPUs respectively perform the process for determining whether the pulse widths and the pulse periods of the generated PWM pulse signals 210 and 211 coincide with the set values of the signal generation units 82 and 84 respectively, thereby increasing the processing loads of the CPUs.

An object of the present invention is to provide a technology that enables a more detailed failure diagnosis on a PWM timer while suppressing an increase in processing load of a CPU provided in a microcontroller having the PWM timer built therein.

The above and other objects and novel features of the present invention will be apparent from the description of the specification and the accompanying drawings.

A summary of a typical one of the inventive aspects of the invention disclosed in this application will be briefly described as follows:

The present microcontroller includes a central processing unit, a PWM signal generation unit which generates a PWM signal according to a generation condition of a PWM signal set by the central processing unit, and a diagnostic unit which inputs the generated PWM signal therein and detects a pulse period and a pulse width, based on the input signal and which determines whether the detected pulse period and pulse width respectively coincide with a pulse period and a pulse width corresponding to the generation condition.

An advantageous effect obtained by a typical one of the inventive aspects of the invention disclosed in the present application will briefly be explained as follows:

The present microcontroller enables a more detained failure diagnosis on a PWM timer while suppressing an increase in processing load of a CPU.

DETAILED DESCRIPTION

1. Summary of the Embodiments

Figure 1:
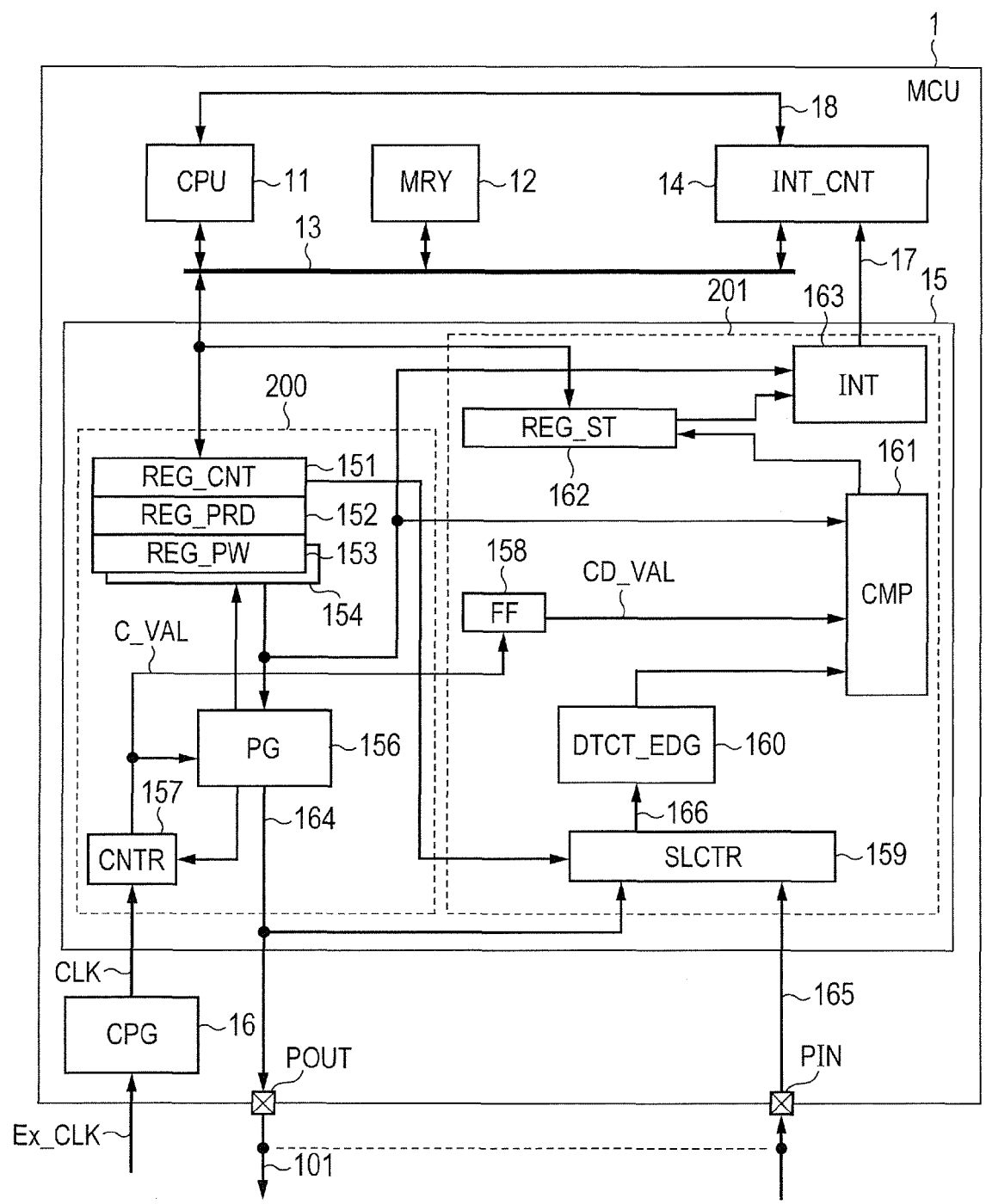
FIG. 1 is a block diagram showing one example of a microcontroller equipped with a PWM timer function and its diagnostic function.

A summary of typical embodiments of the invention disclosed in the present application will first be explained. Reference numerals of the accompanying drawings referred to with parentheses in the description of the summary of the typical embodiments only illustrate elements included in the concept of components to which the reference numerals are given.

[1] (Microcontroller Equipped with Dedicated Circuit Modules for Diagnosis of PWM Signal)

A microcontroller (1 through 10) according to a typical embodiment of the present invention has a central processing unit (11), and a PWM signal generation unit (200, 21) which generates a PWM signal according to a generation condition set by the central processing unit. Further, the microcontroller has a diagnostic unit which detects a pulse period and a pulse width of the PWM signal, based on the PWM signal generated by the PWM signal generation unit and compares the detected pulse period and pulse width with the pulse period and pulse width of the PWM signal based on the generation condition to thereby perform a diagnosis of the PWM signal generation unit. The diagnostic unit may be configured as, for example, a diagnostic unit (201, 20, 30, 40) which inputs a PWM signal generated by the PWM signal generation unit therein and detects a pulse period and a pulse width, based on the input signal and which compares the detected pulse period and pulse width with a pulse period and a pulse width corresponding to the generation condition to thereby perform a diagnosis of the PWM signal generation unit.

According to this, since the diagnostic unit rather than the central processing unit performs the process for the diagnosis, a failure decision of the PWM signal generation unit can be performed without increasing a processing load of the central processing unit. Comparing the detected pulse period and pulse width with the pulse period and pulse width corresponding to the generation condition enables a more detailed failure decision of the PWM signal generation unit.

[2] (Correction of PWM Signal (Duty Ratio 10%))

In the microcontroller according to the paragraph (1), when the generation condition under which the pulse width of the PWM signal becomes zero, is set to the PWM signal generation unit, the diagnostic unit (40) corrects the input PWM signal to be a high level only for a first period (e.g., period corresponding to one clock cycle of a clock signal CLK) shorter than the pulse period for the set generation condition and detects a pulse period and a pulse width of the corrected PWM signal (190) to thereby perform the comparison.

In the microcontroller according to the paragraph (2), when the duty ratio 0% is set as the generation condition, the PWM signal is so corrected that the rising edge of the signal can be detected. Since it is thus possible to detect a pulse even in the case of the duty ratio 0%, a failure decision of the PWM signal generation unit can be performed even when the duty ratio 0% is set as the generation condition.

[3] (Correction of PWM Signal (Duty Ratio 100%))

In the microcontroller according to the paragraph 1 or 2, when the generation condition under which the pulse width and the pulse period of the PWM signal coincide with each other, is set to the PWM signal generation unit, the diagnostic unit (40) corrects the input PWM signal to be a low level only for a second period (e.g., period corresponding to one clock cycle of the clock signal CLK) shorter than the pulse period for the set generation condition and detects a pulse period and a pulse width of the corrected PWM signal (190) to thereby perform the comparison.

In the microcontroller according to the paragraph 3, when the duty ratio 100% is set as the generation condition, the PWM signal is so corrected that the falling edge of the signal can be detected. Since it is thus possible to detect a pulse even in the case of the duty ratio 100%, a failure decision of the PWM signal generation unit can be performed even when the duty ratio 100% is set as the generation condition.

[4] (Generation Method of Correction Pulse when Duty Ratio 0% is Taken)

In the microcontroller according to the paragraph 2 or 3, the diagnostic unit has a pulse correction unit (191) which corrects and outputs the input PWM signal according to the generation condition set to the PWM signal generation unit, a detection unit (171) which detects rising and falling edges of the signal outputted from the pulse correction unit, and a comparison unit (192) which calculates a pulse period and a pulse width of the signal outputted from the pulse correction unit, based on the detected edges and compares the calculated pulse period and pulse width with the pulse period and pulse width corresponding to the generation condition. When the generation condition under which the pulse width of the PWM signal becomes zero is set to the PWM signal generation unit, the pulse correction unit generates a first signal (virtual rising edge signal) which is brought to a high level only for the first period with a timing (e.g., a timing of a clock cycle 11 of FIG. 10) at which a time corresponding to a pulse period has elapsed from a rising edge of the immediately preceding PWM signal and takes a logical ORing of the first signal and the input PWM signal to thereby generate the post-correction PWM signal. When the generation condition under which the pulse width of the PWM signal becomes zero, is set to the PWM signal generation unit, the comparison unit determines that a PWM signal corresponding to the generation condition has been generated if the calculated pulse period and the pulse period corresponding to the generation condition coincide with each other, and the calculated pulse width and the pulse width corresponding to the first period coincide with each other, and determines that the PWM signal corresponding to the generation condition has not been generated if the calculated pulse period and the pulse period corresponding to the generation condition do not coincide with each other or the calculated pulse width and the pulse width corresponding to the first period do not coincide with each other.

According to this, when the duty ratio 0% is set as the generation condition, the PWM signal can easily be corrected, and a failure decision of the PWM signal generation unit is facilitated.

[5] (Generation Method of Correction Pulse when Duty Ratio 100% is Taken)

In the microcontroller according to the paragraph 4, when the generation condition under which the pulse width and the pulse period of the PWM signal coincide with each other, is set to the PWM signal generation unit, the pulse correction unit generates a second signal (virtual falling edge signal) brought to a high level only for the second period with a timing (e.g., a timing of a clock cycle 14 of FIG. 11) at which a predetermine period has elapsed from the time when the input PWM signal has risen, and takes a logical ANDing of an inverted signal of the second signal and the input PWM signal to thereby generate the post-correction PWM signal. When the generation condition under which the pulse width and the pulse period of the PWM signal coincide with each other, is set to the PWM signal generation unit, the comparison unit determines that a PWM signal corresponding to the generation condition has been generated if the calculated pulse period and the pulse period corresponding to the generation condition coincide with each other and the calculated pulse width and a pulse width obtained by making the pulse width corresponding to the generation condition short by the second period coincide with each other, and the comparison unit determines that the PWM signal corresponding to the generation condition has not been generated if the calculated pulse period and the pulse period corresponding to the generation condition do not coincide with each other or the calculated pulse width and the pulse width shortened by the second period do not coincide with each other.

According to this, when the duty ratio 100% is set as the generation condition, the PWM signal can easily be corrected, and a failure decision of the PWM signal generation unit is facilitated.

[6] (Register Storing Generation Condition at Diagnostic Unit)

In the microcontroller (3, 4) according to any of the paragraphs 1 through 3, the PWM signal generation unit has a first register (152, 153) for storing therein the generation condition including the pulse period and pulse width. The diagnostic unit further includes a second register (183, 184) for storing therein information including the generation condition stored in the first register. Further, the diagnostic unit (30, 40) performs the determination, based on the generation condition stored in the second register.

The microcontroller according to the paragraph 6 is provided with the registers for storing the generation condition in the PWM signal generation unit and the diagnostic unit respectively, thereby making it possible to more improve the reliability of the diagnostic unit.

[7] (Acquiring Generation Condition by Snooping and Storing the Same in Register of Diagnostic Unit)

In the microcontroller according to the paragraph 6, the diagnostic unit (30, 40, 170) monitors writing of the generation condition into the first register by the central processing unit, acquires the generation condition to be written by the central processing unit and stores the same in the second register.

According to this, since the diagnostic unit itself rather than the central processing unit writes the generation condition into the second register, an increase in the processing load of the central processing unit does not occur.

[8] (Details of Snoop Processing)

In the microcontroller according to the paragraph 7, the central processing unit (11), the PWM signal generation unit (21) and the diagnostic unit (30, 40, 170) are coupled to one another via an internal bus (13). The central processing unit outputs an address value indicative of the first register and data related to the generation condition onto the internal bus when the generation condition is written into the first register. The diagnostic unit monitors an address value outputted onto the internal bus, and when the outputted address value is found to be the address value indicative of the first register, the diagnostic unit acquires the data related to the generation condition outputted onto the internal bus and holds the same in the second register.

According to this, it is possible to easily realize that the diagnostic unit writes the generation condition into the second register.

[9] (Output and Input Terminals for PWM Signal).

The microcontroller according to any of the paragraphs 1 through 3 or 6 through 8 further includes a first terminal (POUT) for outputting the PWM signal generated by the PWM signal generation unit to the outside, and a second terminal (PIN) for inputting a signal from outside. The diagnostic unit may be capable of selecting the PWM signal outputted to the first terminal and the PWM signal inputted via the second terminal as PWM signals target for the determination.

According to this, for example, the first terminal and the second terminal are electrically coupled to each other outside the microcontroller, so that abnormalities in the function of outputting the PWM signal from the first terminal and the function of inputting each signal from the second terminal can also be diagnosed.

[10] (PWM Signal Generation Unit and Diagnostic Unit— Same Module)

In the microcontroller (1) according to any of the paragraphs 1 through 9, the PWM signal generation unit (200) and the diagnostic unit (201) are configured within a common circuit module (15).

According to this, for example, there is a high possibility that component circuits that configure the PWM signal generation unit, and component circuits that configure the diagnostic unit can be shared in common. This therefore contributes to a reduction in the area of the circuit module including the PWM signal generation unit and the diagnostic unit and their cost saving.

[11] (PWM Signal Generation Unit and Diagnostic Unit Discrete Modules)

In the microcontroller (2 through 9) according to any of the paragraphs 1 through 9, the PWM signal generation unit (21) and the diagnostic unit (20, 30, 40) are configured as circuit modules separated from each other.

For example, the PWM signal generation unit and the diagnostic unit are comprised of discrete semiconductor chips, so that independence between a target for diagnosis and a diagnostic subject can be secured. They can therefore be applied to a safety standard that requires higher reliability. Arranging circuit blocks for the PWM signal generation unit and the diagnostic unit in isolation even where the PWM signal generation unit and the diagnostic unit are configured within the same semiconductor chip makes it possible to more improve reliability.

[12] (High Speed Bus and Low Speed Bus)

The microcontroller (5 through 9) according to any of the paragraphs 1 through 11 further includes a first bus (13) operated in a first bus clock (high speed clock) and to which the central processing unit is coupled, a second bus (52) operated in a second bus clock (low speed clock) different from the first bus clock and to which the PWM signal generation unit and the diagnostic unit are coupled, and a bus control unit (51) for controlling communications between the first bus and the second bus. The second bus clock is lower than the first bus clock in frequency.

According to this, the PWM signal generation unit or the like that no requires high-speed processing is operated in an operation clock lower in speed than an operation clock for the central processing unit, thereby making it possible to suppress power consumption.

[13] (Plural PWM Timers+One Diagnostic Unit)

A microcontroller (7) according to a typical embodiment of the present invention is of a microcontroller in which in the paragraph 1, the PWM signal generation unit is comprised of a plurality of lower PWM signal generation parts configured so as to generate a plurality of PWM signals different from one another, and a first selection unit is further provided which inputs the PWM signals outputted from the PWM signal generation unit and selects and outputs any of the input PWM signals, and in which the diagnostic unit inputs the PWM signal outputted from the first selection unit therein, detects a pulse period and a pulse width of the input PWM signal, based on the PWM signal and compares the detected pulse period and pulse width with the pulse period and pulse width of the PWM signal based on the generation condition. Described more specifically, the microcontroller (7) has, for example, a central processing unit (11), a plurality of lower PWM signal generation units (21_1 through 21_M) which generate PWM signals according to generation conditions for the PWM signals set by the central processing unit, and a first selection unit (55) which inputs the PWM signals outputted from the lower PWM signal generation units therein and selects and outputs any of the input PWM signals. Also the microcontroller has a diagnostic unit (20) which inputs the PWM signal outputted from the first selection unit therein and detects a pulse period and a pulse width, based on the input signal and which determines whether the detected pulse period and pulse width respectively coincide with the pulse period and pulse width corresponding to the generation condition.

According to this, as with the paragraph 1, a more detailed failure decision of the PWM signal generation, unit can be conducted without increasing the processing load of the central processing unit. According to this, even when a plurality of PWM signals are generated, diagnosis can selectively be conducted by one diagnostic unit so that there is no need to provide diagnostic units according to the number of the generated PWM signals, thus contributing to a reduction in the area of the microcontroller.

[14] (Output and Input Terminals for PWM Signal)

The microcontroller according to the paragraph 13 further includes a plurality of first terminals (POUT_1 through POUT_M) for outputting a plurality of PWM signals generated by the PWM signal generation unit to the outside, and a second terminal (PIN_1 through PIN_N) for receiving each PWM signal input by the first selection unit from outside. The first selection unit selects any one of the PWM signals outputted to the first terminals and outputs the same as a first PWM signal, and selects any one of the PWM signals input via the second terminal and outputs the same as a second PWM signal. The diagnostic unit may be capable of selecting the first PWM signal and the second PWM signal as PWM signals target for the determination.

According to this, for example, the first and second terminals are electrically coupled to each other outside the microcontroller, so that abnormalities in the function of outputting the PWM signal from each first terminal and the function of inputting the signal from the second terminal can also be diagnosed.

[15] (One PWM Timer+Plural Diagnostic Units)

Another microcontroller (8) according to a typical embodiment of the present invention is of a microcontroller which in the paragraph 1, has a function which inputs each PWM signal outputted from the PWM signal generation unit therein and detects a pulse period and a pulse width of the input PWM signal, based on the PWM signal, and compares the detected pulse period and pulse width with the pulse period and pulse width of the PWM signal based on the generation condition, and which further includes other diagnostic units different from the diagnostic unit. Described more specifically, the microcontroller (8) has a central processing unit (11) and a PWM signal generation unit (21) which generates each PWM signal according to a generation condition for each PWM signal set by the central processing unit. The microcontroller has a plurality of diagnostic units (20_1 through 20_N) each of which inputs the PWM signal outputted from the PWM signal generation unit therein and detects a pulse period and a pulse width based on the input signal, and determines whether the detected pulse period and pulse width respectively coincide with the pulse period and pulse width corresponding to the generation condition.

According to this, as with the paragraph 1, a more detailed failure decision of the PWM signal generation unit can be conducted without increasing the processing load of the central processing unit. According to this as well, since one PWM signal can be diagnosed by plurality of diagnostic units, the reliability of a diagnosis result is improved.

[16] (Output and Input Terminals for PWM Signal)

The microcontroller according to the paragraph 15 has a first terminal (POUT) for outputting each PWM signal generated by the PWM signal generation unit to the outside, and a plurality of second terminals (PIN_1 through PIN_N) for inputting signals from outside. The microcontroller further includes a first selection unit (62) having in association with the diagnostic units, plurality of selection circuits (622_1 through 622_N) which respectively input the PWM signals input from the second terminals therein, select any one of the input PWM signals and output the same to the one diagnostic unit. Each of the diagnostic units may be capable of selecting the PWM signal outputted to the first terminal and the signal selected by the corresponding selection circuit as PWM signals target for the determination.

According to this, for example, the first and second terminals are electrically coupled to each other outside the microcontroller, so that abnormalities in the function of outputting the PWM signal from the first terminal and the function of inputting the signal from each second terminal can also be diagnosed.

[17] (Plural PWM Timers+Plural Diagnostic Units)

A further microcontroller (9) according to a typical embodiment of the present invention is of a microcontroller in which in the paragraph 1, the PWM signal generation unit includes m lower PWM signal generation units configured so as to generate m (where m: integer greater than or equal to 2) PWM signals different from one another, and a first section unit is further provided which inputs the PWM signals outputted from the PWM signal generation unit and selects and outputs any of the input PWM signals, and in which the diagnostic unit includes n (where n: integer greater than or equal to 1) lower diagnostic units each of which inputs the PWM signal outputted from the first selection unit therein and detects a pulse period and a pulse width of the input PWM signal, based on the PWM signal and each of which compares the detected pulse period and pulse width with the pulse period and pulse width of the PWM signal based on the generation condition. Described more specifically, the microcontroller (9) has a central processing unit (11), m (where m: integer more than or equal to 1) lower PWM signal generation units (21_1 through 21_M) which generate PWM signals according to generation conditions for the PWM signals set by the central processing unit, and a first selection unit (65) which inputs a plurality of PWM signals (164_1 through 164_M and 165_1 through 165_N) outputted from the lower PWM signal generation units and selects and outputs any of the input PWM signals. The microcontroller also has n (where n: integer greater than or equal to 1) lower diagnostic units (20_1 through 20_N) which respectively input the PWM signal outputted from the first selection unit therein and detect a pulse period and a pulse width, based on the input signal, and which respectively determine whether the detected pulse period and pulse width coincide with the pulse period and pulse width corresponding to the generation condition.

According to this, as with the paragraph 1, a more detailed failure decision of the PWM signal generation unit can be conducted without increasing the processing load of the central processing unit. According to this as well, since the combination of a target for diagnosis and a diagnostic subject can freely be determined according to the respective numbers of the PWM signal diagnostic units and the diagnostic units, the degrees of freedom of design increases.

[18] (Output and Input Terminals for PWM Signal)

The microcontroller according to the paragraph 17 further includes m first terminals (POUT_1 through POUT_M) for respectively outputting the generated m PWM signals to the outside, and a plurality of second terminals (PIN_1 through PIN_N) for respectively receiving the PWM signals input to the first selection unit from outside. The first selection unit has, in association with the diagnostic units, n selection circuits (651_1 through 651_N and 652_1 through 652_N) each of which selects any one of the m PWM signals outputted to the first terminals and outputs the same to the one diagnostic unit as a first PWM signal, and selects any one of the PWM signals input via the second terminals and outputs the same thereto as a second PWM signal. Each of the diagnostic units may be capable of selecting the PWM signal outputted to the first terminal and the signal selected by the corresponding selection circuit as PWM signals target for the determination.

According to this, for example, the first and second terminals are electrically coupled to each other outside the microcontroller, so that abnormalities in the function of outputting the PWM signal from each first terminal and the function of inputting the signal from each second terminal can also be diagnosed.

[19] (Control Device)

A control device (104) according to a typical embodiment of the present invention is of a control device for controlling a motor. The control device includes a microcontroller (10) which generates each PWM signal for driving the motor and outputs an error signal from an external terminal (OUT) where the generated PWM signal is abnormal, a driver (105) for driving the motor (101), based on the generated PWM signal, and a safety device (106) which performs a process for preventing an abnormal operation of the motor in response to the error signal. The microcontroller has a central processing unit (11), a PWM signal generation unit (200, 21) which generates each PWM signal according to a generation condition set by the central processing unit, and a diagnostic unit (201, 20, 30, 40) which inputs the generated PWM signal therein and detects a pulse period and a pulse width thereof, based on the input PWM signal and which determines whether the detected pulse period and pulse width coincide with a pulse period and a pulse width corresponding to the generation condition. Further, the microcontroller outputs the error signal to the external terminal according to the result of determination.

According to this, as with the paragraph 1, a failure decision of the PWM signal generation unit can be conducted without increasing the processing load of the central processing unit in the microcontroller. Comparing the detected pulse period and pulse width with the pulse period and pulse width corresponding to generation condition respectively enables a more detailed failure decision, thereby making it possible to more improve the safety of motor control.

[20] (Diagnostic Method of Diagnostic Unit Itself)

A determination method according to a typical embodiment of the present invention is a determination method for determining whether a diagnostic unit of a microcomputer (1 through 9) having a PWM signal generation unit (200, 21) which generates each PWM signal according to a set generation condition, and the diagnostic unit (201, 20, 30, 40) which determines whether the PWM signal generated by the PWM signal generation unit is of a signal having a pulse period and a pulse width corresponding to a condition set thereto, is normal. The determination method includes a first step (S105 through S107) for setting a condition (first generation condition) equivalent to the generation condition (first generation condition) set to the PWM signal generation unit to the diagnostic unit, determining that the diagnostic unit is normal when the diagnostic unit determines that the generated PWM signal coincides with a PWM signal corresponding to the equivalent condition, and determining that the diagnostic unit is abnormal when the two are determined not to coincide with each other. Further, the determination method has a second step (S108, S109) for setting a condition (second generation condition) different from the generation condition (first generation condition) set to the PWM signal generation unit to the diagnostic unit, determining that the diagnostic unit is abnormal when the generated PWM signal coincides with a PWM signal corresponding to the different condition, and determining that the diagnostic unit is normal when the two are determined not to coincide with each other.

According to this, it is possible to easily diagnose whether the diagnostic unit itself is operated normally. Since the diagnosis is conducted by the two of the first step for setting the condition equivalent to the generation condition set to the PWM signal generation unit and the second step for setting the condition different from the generation condition set to the PWM signal generation unit, the accuracy of diagnosis with respect to the diagnostic unit can be enhanced. It is thus possible to improve not only the reliability of the PWM signal generation unit but also the reliability of the diagnostic unit.

2. Further Detailed Description of the Embodiments

Embodiments will be explained in further detail.

First Embodiment

FIG. 1 is a block diagram showing one example of a microcontroller equipped with a PWM timer function and its diagnostic function.

The microcontroller (MCU) 1 shown in the same drawing is comprised of, for example, a CPU 11, a memory (MRY) 12, an internal bus 13, an interrupt controller (INT_CNT) 14, a PWM timer 15 and a clock generator (CPG) 16, and other unillustrated peripheral circuit modules. The CPU 11 is a processor which executes a command related to a program stored in the memory 12 or the like and performs processing such as an arithmetic operation, a data transfer, etc. The memory 12 includes a storage area for storing a program executed by the CPU 11 and data calculated by the corresponding program processing. The interrupt controller 14 receives interrupt requests from the peripheral circuit modules such as the PWM timer 15, etc. selects the request highest in priority from within the received interrupt requests and outputs an interrupt signal to the CPU 11 through an exclusive line 18. The clock generator 16 inputs an external clock signal EX_CLK generated by a crystal oscillator therein through an external terminal for example, generates a clock signal CLK high in precision, based on the input external clock signal EX_CLK, and supplies it to each circuit module in the microcontroller 1.

The PWM timer 15 is equipped with a signal generating function unit 200 which generates a PWM signal, and a diagnostic function unit 201 which performs a diagnosis of the PWM signal. A signal generating function will first be explained.

The PWM timer 15 has, as the signal generating function unit 200, e.g., a control register (REG_CNT) 151, a pulse period register (REG_PRD) 152, a pulse width register (REG_PW) 153, a pulse width buffer 154, a pulse generator (PG) 156 and a counter (CNTR) 157. When the CPU 11 sets a condition for generating the PWM signal to each of the registers 151 through 153 via the internal bus 13, for example, the pulse generator 156 generates a PWM signal 164 based on a count value C_VAL of a clock signal CLK counted by the counter 157.

The control register 151 is set with, by the CPU 11, e.g., information (hereinafter also referred to as pulse output control information) indicative of whether the pulse generator 156 performs the output of a PWM signal, selection information (hereinafter also called pulse selection information) for designating or specifying a PWM signal target for diagnosis to be described later, information (hereinafter also called interrupt generation control information) indicative of whether an interrupt is generated where the result of diagnosis to be described later is an error, and information (hereinafter also called comparison process control information) indicative of whether a comparison process should be performed by a comparator 161 to be described later.

Th pulse period register 152 is set with, by the CPU 11, e.g., information indicative of a pulse period of a PWM signal to be generated. The pulse width register 153 is set with, by the CPU 11, e.g., information indicative of a pulse width of a PWM signal to be generated. The values set to the pulse period register 152 and the pulse width register 153 are values to be compared with the count value counted by the counter 157. Here, the value set to the pulse period register 152 is assumed to specify the pulse period of a PWM signal being outputted at that time. The value set to the pulse width register 153 is assumed to be written into the pulse width buffer 154 at a timing provided to output a PWM signal to be next output. The value written into the pulse width buffer 154 is assumed to specify the pulse width of a PWM signal being in output at that time.

The pulse width buffer 154 is a buffer for adjusting the timing provided to output the PWM signal having the pulse width set to the pulse width register 153. The value of the pulse width register 153 is set thereto. The details of the pulse width buffer 154 will be described later.

The values of the control register 151, the pulse period register 152 and the pulse width register 153 are respectively outputted to the pulse generator 156, the comparator 161 and the interrupt generator 163.

The counter 157 counts a clock CLK. The counter value C_VAL thereof is used to determine the pulse period and pulse width of the PWM signal.

The pulse generator 156 monitors the count value C_VAL of the counter 157. When the value of the pulse width buffer 154 is not zero (duty ratio 0%) and the count value C_VAL coincides with the value set to the pulse period register 152, the pulse generator 156 changes the level of the PWM signal 164 to a High level with the rise timing of the next clock signal CLK and outputs a write signal to the pulse width buffer 154 to cause the pulse width buffer 154 to write the value of the pulse width register 153. At this time, the pulse generator 156 further outputs a reset signal to the counter 157 to set the count value C_VAL to an initial value "1". Thereafter, when the count value C_VAL coincides with the value of the pulse width buffer 154, the pulse generator 156 changes the level of the PWM signal 164 to a Low level with the next rise timing of the clock signal CLK. Incidentally, the value settable as the pulse width ranges from zero to the value of the pulse period. When the pulse width is zero, the PWM signal 164 becomes a signal (duty ratio 0%) of a low level during the whole one period. When the pulse width is the same value as the pulse period, the PWM signal becomes a signal (duty ratio 100%) of a high level during the whole one period. A concrete method of generating the PWM signal 164 will be explained in detail using FIG. 2.

Figure 2:
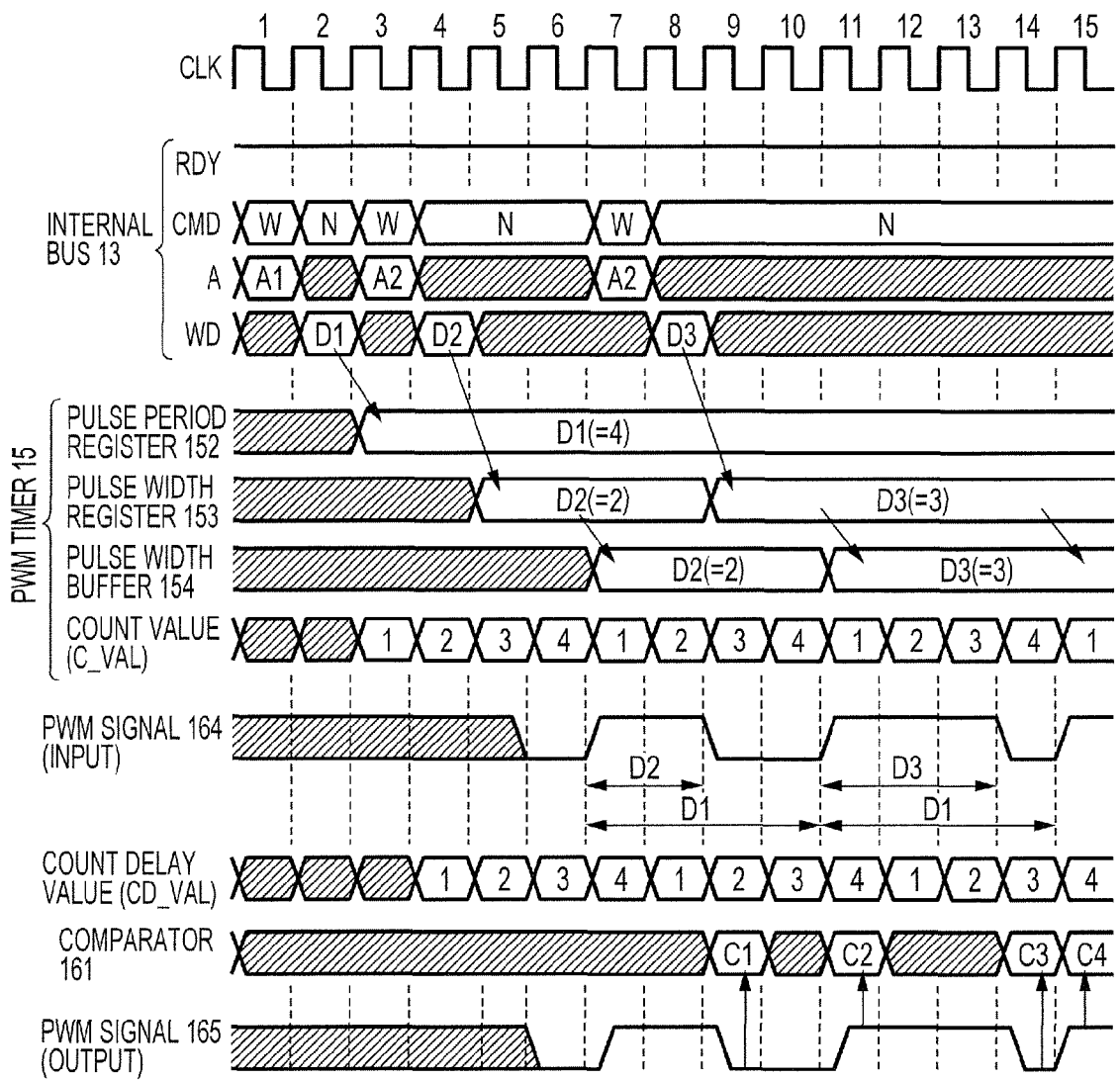
FIG. 2 is a timing chart showing one example illustrative of operation timings of a PWM timer 15.

FIG. 2 is a timing chart showing one example illustrative of operation timings of the PWM timer 15.

Assume that the setting of pulse outputting has been made to the control register 151 in the same drawing. In order to facilitate understanding, the same drawing shows where the pulse periods of two PWM signals different in pulse width are assumed to be values extremely short in pulse period, but not limited to these. Assuming that, for example, the frequency of the clock signal CLK is 20 MHz during an actual operation, the PWM signal 164 is a pulse period of 20 kHz or so and becomes 1000 cycles. Incidentally, the clock signal CLK is assigned numbers indicative of clock cycles in the same drawing.

In the same drawing, signals outputted to the internal bus 13 include a ready signal RDY, a command signal CMD, an address signal A and write data WD. For example, the ready signal RDY indicates whether a bus command CMD is valid or invalid. When it is valid, the ready signal RDY becomes "1 (High)". When it is invalid, the ready signal RDY becomes "0 (Low)". The bus command CMD indicates the type of access of the CPU 11. "W" indicates a write command, and "N" indicates a command (NOP: Non Operation) indicating that nothing is done. An address A includes addresses for registers and a memory targeted for access by the CPU 11. The write data WD is data to be written into a register or the like specified by the address A.

In a clock cycle 1 as shown in the same drawing, the CPU 11 outputs a write command W and an address A1 to the internal bus 13. The address A1 is an address for the pulse period register 152. In the next clock cycle 2, the CPU 11 outputs write data D1. Then, when the write data D1 is written into the pulse period register 152 in a clock cycle 3, the counter 157 starts counting. In the clock cycle 3, the CPU 11 outputs a write command W and an address A2 to the internal bus 13. The address A2 is an address for the pulse width register 153. In the next clock cycle 4, the CPU 11 outputs write data D2. In a clock cycle 5, the write data D2 is written into the pulse width register 153. Even in a clock cycle 7, the write access to the pulse width register 153 by the CPU 11 is performed so that write data D3 (=3) is written therein.

When the value of the counter 157 coincides with a value D1 (=4) of the pulse period register 152 in a clock cycle 6, the pulse generator 156 brings the level of the PWM signal 164 to a High level in the next clock cycle 7. Further, the pulse generator 156 resets the counter 157 to the initial value "1" and writes a value D2 (=2) of the pulse width register 153 into the pulse width register 154. Thereafter, when the value of the counter 157 coincides with the value "2" of the pulse width buffer 154 in a clock cycle 8, the pulse generator 156 brings the level of the PWM signal 164 to a Low level. Assuming that the pulse generator 156 determines the pulse width based on not the pulse width buffer 154, but instead the pulse width register 153, the value of the pulse width register 153 is reflected as the pulse width of a PWM signal being output where the PWM signal is written into the pulse width register 153 with a timing prior to its fall timing. When the writing thereof is however done after the fall timing of a pulse, the value of the pulse width register 153 can not be reflected as the pulse width of the PWM signal being output at that time. That is, when the timing provided to perform writing into the pulse width register 153 by the CPU 11 and the fall timing of the pulse occur one after another, the value set to the pulse width register 153 may not be reflected on the PWM signal. In the PWM timer 15, in order to prevent such a phenomenon from occurring, the value of the pulse width register 153 is written into the pulse width buffer 154 in the timing (e.g., the clock cycles 7 and 11 in FIG. 2) at which the next pulse period is started, and the pulse width of the PWM signal is determined based on the value set to the pulse width buffer 154.

Thereafter, when the value of the counter 157 coincides with the value "4" of the pulse period register 152 in a clock cycle 10, the pulse generator 156 brings the level of the PWM signal 164 to a High level in the next clock cycle 11. Further, the pulse generator 156 resets the counter 157 to the initial value "1" and writes a value D3 (=3) of the pulse width register 153 into the pulse width register 154. Then, when the value of the counter 157 coincides with the value "3" of the pulse width buffer 154 in a clock cycle 13, the pulse generator 156 brings the level of the PWM signal 164 to a Low level in the next clock cycle 14.

By repeatedly performing the above processing, the PWM timer 15 generates a PWM signal in accordance with the generation condition of the PWM signal set by the CPU 11.

The diagnostic function of the PWM timer 15 will next be explained. The PWM timer 15 has, as diagnostic function unit 201, e.g., a flip-flop circuit (FF) 158, a pulse selector (SLCTR) 159, an edge detector (DTCT_EDG) 160, a comparator (CMP) 161, a status register (REG_ST) 162, and an interrupt generator (INT) 163.

The pulse selector 159 selects a PWM signal target for diagnosis from input PWM signals and outputs it to the edge detector 160. For example, the pulse selector 159 inputs therein a PWM signal 164 outputted from the pulse generator 156 and an external PWM signal 165 inputted from an external input terminal PIN and selects and outputs either one of the PWM signals. Whether either of the PWM signals should be selected is determined according to the pulse selection information set to the control register 151.

The edge detector 160 detects the rising and falling edges of the PWM signal 166 selected by the pulse selector 159 and outputs an edge detection signal. The flip-flop circuit 158 outputs a count value (hereinafter also called a count delay value) CD_VAL obtained by delaying the count value C_VAL by one cycle of the clock signal CLK.

According to the edge detection signal output from the edge detector 160, the comparator 161 takes in a count delay value CD_VAL of the flip-flop circuit 158 at the time that the rising edge has been detected, and a count delay value CD_VAL of the flip-flop circuit 158 at the time that the falling edge has been detected. Then, the comparator 161 compares the value of the flip-flop circuit 158 at the detection of the rising edge and the value of the pulse period register 152 with each other and determines whether they coincide with each other. Further, the comparator 162 compares the value of the flip-flop circuit 158 at the detection of the falling edge, and the value set to the pulse width register 153 with each other and determines whether they coincide with each other. The results of determination are outputted to the status register 162.

The status register 162 has a failure detection bit indicative of whether the comparator 161 has detected an incoincidence. For example, when the comparator 161 has detected an incoincidence in pulse period or pulse width, it holds a value indicative of an error and continues to hold that value even subsequently.

The interrupt generator 163 monitors the status register 162. When information indicative of an error is set to the status register 162, the interrupt generator 163 issues an interrupt request to the interrupt controller 14. Whether an interrupt should be generated where the comparator 161 has detected the incoincidence in pulse period or pulse width, is determined according to the interrupt generation control information set to the control register 151.

Operation timings related to the diagnosis of the PWM signal will be explained in detail using FIG. 2. Assume that in the same drawing, as one example, the pulse selector 159 selects and outputs a PWM signal.

As shown in FIG. 2, when the edge detector 160 detects the falling edge of the PWM signal 164 in a clock cycle 9, the comparator 161 performs a comparison process C1 for comparing the count delay value CD_VAL (=2) and the value of the pulse width buffer 153. That is, the rise timing of the pulse and the timing provided to start counting by the counter 157 are matched with each other and a count delay value CD_VAL obtained by delaying the count value C_VAL is generated, so that the value of the count delay value CD_VAL at the timing of the rising edge can be read as the value of the pulse width of the PWM signal 164. Accordingly, the count delay value CD_VAL read at the corresponding timing and the value of the pulse width buffer 153 are compared with each other to thereby make it possible to determine whether the PWM signal having the pulse width as set has been generated.

Thereafter, when the edge detector 160 detects the rising edge of the PWM signal 164 in the clock cycle 11, the comparator 161 performs a comparison process C2 for comparing the count delay value CD_VAL and the value of the pulse period register 152. That is, as mentioned above, the rise timing of the pulse and the timing provided to start counting by the counter 157 are matched with each other and a count delay value CD_VAL obtained by delaying the count value C_VAL is generated, so that the value of the count delay value CD_VAL at the timing of the rising edge can be read as the value of the pulse period of the PWM signal 164. Accordingly, the count delay value CD_VAL read at the corresponding timing and the value of the pulse period register 152 are compared with each other to thereby make it possible to determine whether the PWM signal having the pulse period as set has been generated.

In accordance with a similar method, a process (C3) for comparison of a pulse width is performed in a clock cycle 14, and a process (C4) for comparison of a pulse period is carried out in a clock cycle 15.

According to the microcontroller 1 according to the first embodiment as described above, the pulse width and the pulse period of the PWM signal are detected to thereby enable a diagnosis as to whether the PWM signal is generated as defined in the generation condition set by the CPU 11. It is thus possible to make a detailed failure diagnosis of the PWM timer 15. Since the process for the above diagnosis is realized not by the CPU 11 but the edge detector 160, the comparator 161 and the like, it is possible to determine the failure of the PWM timer 15 without increasing the processing load of the CPU 11.

According to the microcontroller 1 as well, for example, an external output terminal POUT and an external input terminal PIN are electrically coupled to each other outside the microcontroller 1 to input the PWM signal 164 generated by the pulse generator 156 via the external input terminal PIN, so that it is also possible to diagnose the input PWM signal. According to it, it is also possible to diagnose whether the function of outputting the PWM signal 164 from the external output terminal POUT and the function of inputting the PWM signal from the external input terminal PIN are normal.

According to the microcontroller 1, whether an interrupt should be generated when an error in the PWM signal is detected, can be determined depending on the interrupt generation control information of the control register 151, thus increasing the degree of freedom of system design. Setting an interrupt request so as not to be generated, for example, enables such a system that when the error in the PWM signal is detected, the CPU 11 performs a process corresponding to the error detection after the completion of a process being in execution without interrupting the process being in execution. In this case, for example, the CPU 11 may be designed so as to access the status register 162 on a regular basis and monitor its value.

Further, since the functional unit for generating the PWM signal and the functional unit for diagnosing the PWM signal are configured within the PWM timer 15, the microcontroller 1 can share in common the circuit between the functional unit for generating the PWM signal and the functional unit for diagnosing the PWM signal. Since the functional unit for diagnosing the PWM signal can be utilized as a reference for diagnosing the values of the pulse period register 152, the pulse width register 153 and the pulse width buffer 154, for example, it is not necessary to separately provide a register or the like for setting the generation condition. Likewise, since the count delay value CD_VAL is generated using the count value C_VAL of the counter 157, which is used as a reference for generating the PWM signal, there is no need to provide a counter separately for the purpose of a diagnostic function. Thus, according to the microcontroller 1, it is possible to suppress an increase in chip area with the addition of the diagnostic function to the existing PWM timer 15. Particularly when a PWM timer 15 is newly designed, this can be said to be an effective means.

Second Embodiment

Figure 3:
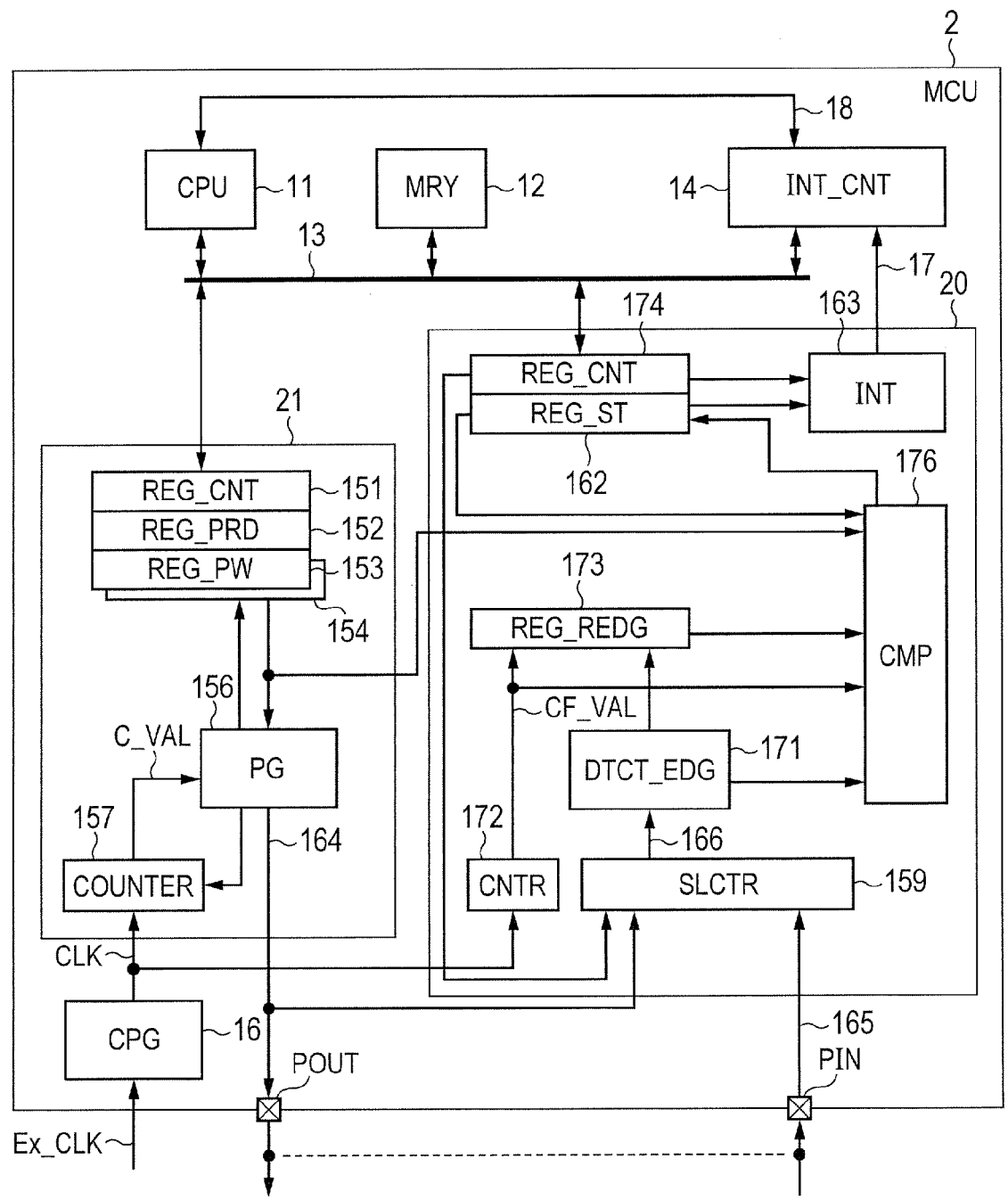
FIG. 3 is a block diagram showing one example of a microcontroller equipped with a PWM timer function and its diagnostic function, according to a second embodiment.

FIG. 3 is a block diagram showing one example of a microcontroller equipped with a PWM timer function and its diagnostic function, according to a second embodiment.

In the first embodiment, the PWM timer 15 is configured so as include the functional unit for generating the PWM signal and the functional unit for diagnosing the PWM signal. In the second embodiment, however, a functional unit for diagnosing a PWM signal is configured as another circuit module independent of a PWM timer.

As shown in FIG. 3, the microcontroller 2 has a PWM signal diagnostic unit 20 in addition to the PWM timer 21. Incidentally, the same reference numerals are respectively attached to the same components as those in the microcontroller 1 of FIG. 1 in the same drawing, and their detailed description will be omitted.

The PWM signal diagnostic unit 20 includes a pulse selector (SLCTR) 159, a counter (CNTR) 172, an edge detector (DTCT_EDG) 171, a rising edge register (REG_REDG) 173, a comparator (CMP) 176, a status register (REG_ST) 162, a control register (REG_CNT) 174 and an interrupt generator (INT) 163.

The pulse selection information, the interrupt generation control information and the comparison process control information are set to the control register 174 by a CPU 11 through an internal bus 13. Incidentally, the pulse output control information is set to its corresponding control register 151 provided within the PWM timer 21.

The counter 172 counts a clock signal CLK independently of a counter 157 provided in the PWM timer 21. The counter 172 may be a counter that performs initialization every period of a PWM signal 164 as with the counter 157. Here, the counter 172 is however illustrated by way of example as a free running counter that does not perform initialization.

The pulse selector 159 selects a PWM signal corresponding to the pulse selection information set to the control register 174 and supplies the same to the edge detector 171. The edge detector 171 detects the rising and falling edges of the PWM signal 166 selected by the pulse selector 159. When the edge detector 171 detects the falling edge of the selected PWM signal, it instructs the rising edge register 173 to write a count value CF_VAL of the counter 172 and instructs the comparator 176 to execute a comparison process. Likewise, even in the case where the rising edge of the selected PWM signal is detected, the edge detector 171 instructs the comparator 176 to execute a comparison process.

In accordance with the write instruction from the edge detector 171, the rising edge register 173 holds therein a count value CF_VAL at that time.

When the comparator 176 receives therein the instruction for execution of the comparison process outputted when the edge detector 171 has detected the rising edge, the comparator 176 obtains a count value CF_VAL of the counter 172 at that time and the value of the rising edge register 173 and calculates the pulse period of the PWM signal 166, based on the thus-obtained value. Further, the comparator 176 compares the value of the calculated pulse period and the value of the pulse period register 152 in the PWM timer 21 and outputs the result of comparison to the status register 162. The pulse period is calculated by, for example, subtracting the value of the rising edge register 173 from the count value CF_VAL acquired on the rising edge. When the comparator 176 receives therein the instruction for execution of the comparison process at the detection of the falling edge by the edge detector 171, the comparator 176 acquires a count value CF_VAL of the counter 172 at that time, and the value of the rising edge register 173 and calculates the pulse width of a PWM signal 166, based on the thus-acquired value. Further, the comparator 176 compares the value of the calculated pulse width and the value of a pulse width buffer 154 in the PWM timer 21 and outputs the result of comparison to the status register 162. The pulse width is calculated by, for example, subtracting the value of the rising edge register 173 from the count value CF_VAL acquired on the falling edge. Incidentally, whether the comparator 176 performs the comparison process is determined in accordance with the comparison process control information set to the control register 174.

As with the first embodiment, when the comparator 176 detects an inconsistency in pulse period or width, the status register 162 holds a value indicative of an error and continues to hold that value even after that. When the interrupt generator 163 monitors the status register 162 and information indicative of an error is set to the status register 162, the interrupt generator 163 issues an interrupt request 17 to an interrupt controller 14. Whether or not an interrupt is generated where the inconsistency in pulse period or width is detected, is determined according to the interrupt generation control information set to the control register 174.

Figure 4:
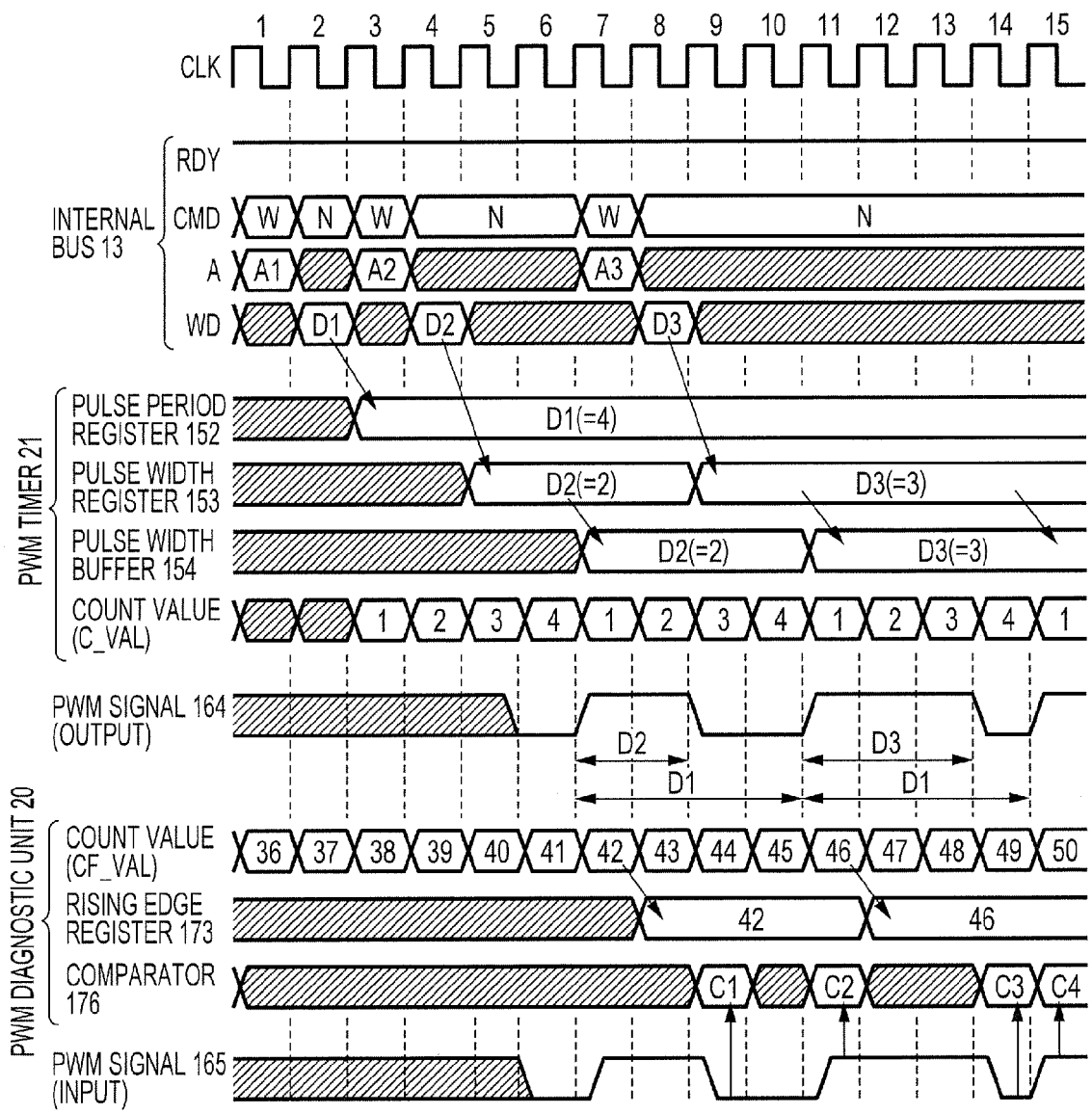
FIG. 4 is a timing chart showing one example illustrative of operation timings of a PWM timer 21 and a PWM signal diagnostic unit 20.

FIG. 4 is a timing chart showing one example illustrative of operating timings of the PWM timer 21 and the PWM signal diagnostic unit 20. Assume that as with FIG. 2 in the same drawing, the setting of carrying out a pulse output is made to the control register 151, and the pulse selector 159 selects and outputs a PWM signal 164. Incidentally, the clock signal CLK is assigned numbers indicative of clock cycles in the same drawing.

In the same drawing, each timing provided to generate the PWM signal 164 is similar to FIG. 2. When the edge detector 171 detects the rising edge of the PWM signal 164 in a clock cycle 7, a count value CF_VAL (=42) of the counter 172 is written into the rising edge register 173 in the next clock cycle 8. Thereafter, when the edge detector 171 detects the falling edge of the PWM signal 164 in a clock cycle 9, the comparator 176 calculates a pulse width thereof and performs a comparison process C1 for comparing the result of calculation and the value of the pulse width buffer 154. In the case of the same figure, a value (=2) obtained by subtracting the value (=42) of the rising edge register 173 from a count value CF_VAL (=44) at the detection of the falling edge becomes the value of the pulse width of the PWM signal 164 and coincides with the value D2 (=2) of the pulse width buffer 154.

Thereafter, when the edge detector 171 detects the rising edge of the PWM signal 164 in a clock cycle 11, the comparator 176 calculates a pulse period thereof and performs a comparison process C2 for comparing the result of comparison and the value of the pulse period register 152. In the case of the same figure, a value (=4) obtained by subtracting the value (=42) of the rising edge register 173 from a count value CF_VAL (=46) at the detection of the rising edge becomes the value of the pulse period of the PWM signal 164 and coincides with the value D1 (=4) of the pulse period register 152. In the next clock cycle 12 during which the edge detector 171 detects the rising edge of the PWM signal 164, the count value CF_VAL (=46) of the counter 172 is written into the rising edge register 173. A process for comparison with respect to a pulse width is performed in a cock cycle 14, and a process for comparison with respect to a pulse period is carried out in a clock cycle 15.

According to the microcontroller 2 according to the second embodiment as described above, a more detailed failure decision of the PWM timer 21 can be carried out without increasing the processing load of the CPU 11. The microcontroller 2 has an advantage that since it is equipped with the PWM signal diagnostic unit 20 as the circuit module independent of the PWM timer 21, the PWM timer part needs less modifications even where the PWM timer 21 is designed using the existing design resources. Arranging circuit blocks for the PWM timer 21 and the PWM signal diagnostic unit 20 in isolation where the PWM timer 21 and the PWM signal diagnostic unit 20 are configured within the same semiconductor chip enables a further improvement in reliability. If the PWM timer 21 and the PWM signal diagnostic unit 20 are comprised of discrete semiconductor chips, independence between a target for diagnosis and a diagnostic subject can be secured. They can therefore be applied to a safety standard that requires higher reliability.

Third Embodiment

Figure 5:
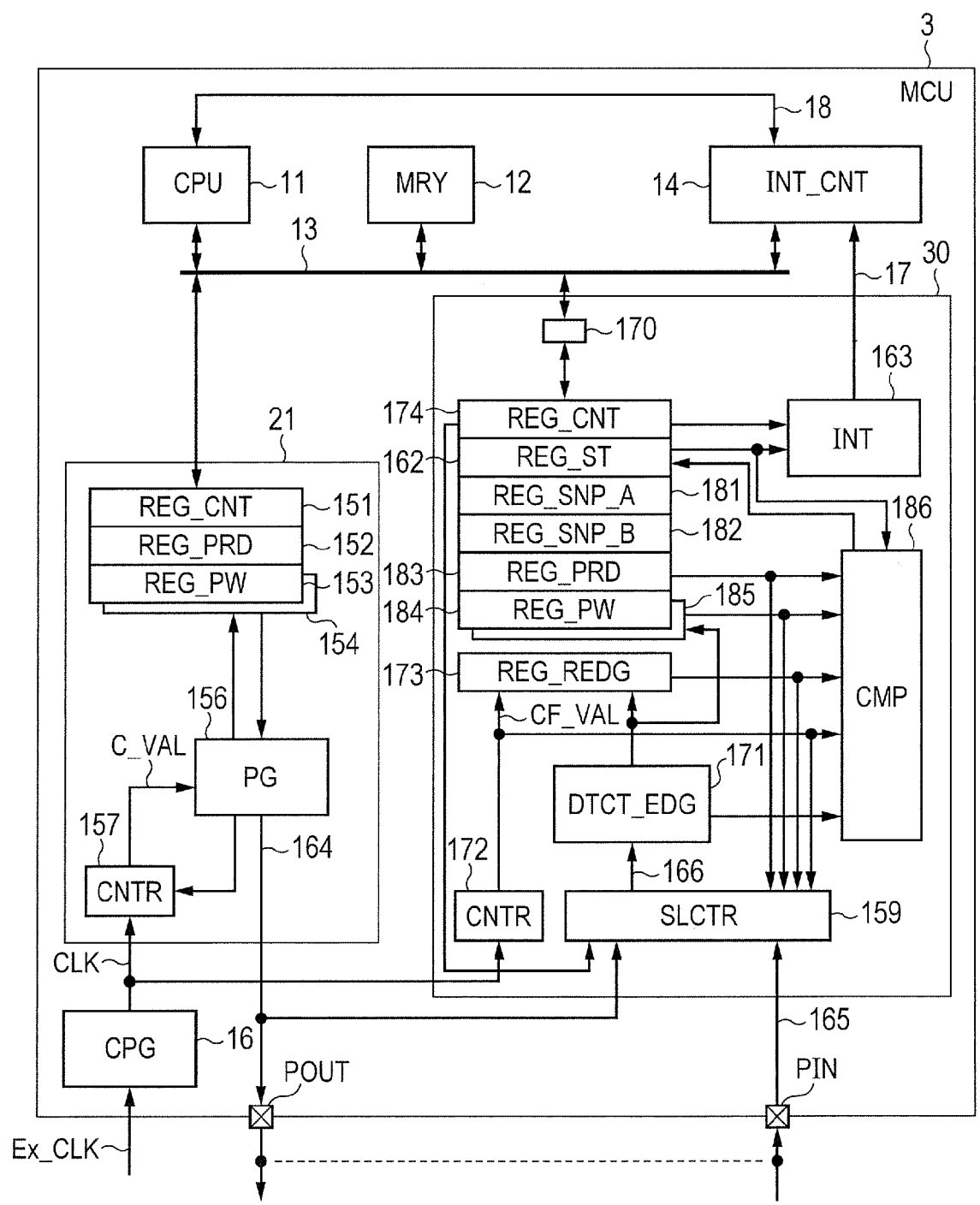
FIG. 5 is a block diagram showing one example of a microcontroller equipped with a PWM timer function and its diagnostic function, according to a third embodiment.

FIG. 5 is a block diagram showing one example of a microcontroller equipped with a PWM timer function and its diagnostic function, according to a third embodiment. In the same drawing, the same reference numerals are respectively attached to the same components as those in the microcontrollers 1 and 2, and their detailed description will be omitted.

The microcontroller 3 shown in the same drawing is provided inside a PWM signal diagnostic unit 30, with registers each of which stores information about the condition of generation of a PWM signal used in the diagnosis of the PWM signal.

The PWM signal diagnostic unit 30 has a pulse selector (SLCTR) 159, a counter (CNTR) 172, an edge detector (DTCT_EDG) 171, a rising edge register (REG_REDG) 173, a comparator (CMP) 186, a register control circuit 170, a status register (REG_ST) 162, a control register (REG_CNT) 174, a snoop register (REG_SNP_A) 181, a snoop register (REG_SNP_B) 182, a pulse period register (REG_PRD) 183, a pulse width register (REG_PW) 184, a pulse width buffer 185 and an interrupt generator (INT) 163.

Information (hereinafter also called "snoop control information") indicative of whether a snoop function based on the register control circuit 170 to be described later should be made valid is set to the control register 174 in addition to the pulse selection information, the interrupt generation control information and the comparison process control information.

The pulse period register 183 is set with information indicative of a pulse period of a PWM signal set to a pulse period register 152 of a PWM timer 21. The pulse width register 184 is set with information indicative of a pulse width of the PWM signal set to a pulse width register 153 of the PWM timer 21. The settings of the pulse period register 183 and the pulse width register 184 are achieved by the snoop function of the register control circuit 170, for example.

The register control circuit 170 monitors each address value outputted onto an internal bus 13 and writes write data outputted onto the internal bus 13 into the register in the PWM signal diagnostic unit 30, corresponding to the outputted address value. When, for example, an address value of the control register 174 is outputted onto the internal bus 13, the register control circuit 170 acquires the write data outputted onto the internal bus 13 and writes the same into the control register 174.

The register control circuit 170 is provided with the snoop function. Described concretely, when address values corresponding to values stored in the snoop registers 181 and 182 are outputted onto the internal bus 13, the register control circuit 170 acquires write data outputted to the internal bus 13 and writes the acquired write data into predetermined registers associated with the snoop registers 181 and 182. Address values for registers or the like target for snooping are set to the snoop registers 181 and 182. For example, when the address value of the pulse period register 152 in the PWM timer 21 is set to the snoop register 181, and the snoop register 181 is associated with the pulse period register 183, the register control circuit 170 acquires write data corresponding to the address value of the pulse period register 152 when the address value is outputted onto the internal bus 13, and writes the acquired write data into the pulse period register 183. Further, for example, when the address value of the pulse width register 153 in the PWM timer 21 is set to the snoop register 182, and the snoop register 182 is associated with the pulse width register 184, the register control circuit 170 acquires write data corresponding to the address value of the pulse width register 153 when the address value is outputted onto the internal bus 13, and writes the acquired write data into the pulse period register 184. According to this, since the CPU 11 needs not to set the generation condition to the pulse period register 183 and the pulse width register 184 for the purpose of diagnosis of the PWM signal, it is possible to suppress an increase in the processing load of the CPU 11 related to the diagnosis of the PWM signal. Incidentally, whether or not the snoop function of the register control circuit 170 is made valid is determined according to the snoop function control information set to the control register 174. When the snoop function is not made valid, each of the pulse period register 183 and the pulse width register 184 is assigned a unique address, and the CPU 11 can also specify the address and obtain access thereto.

When the comparator 186 receives an instruction for execution of a comparison process outputted when the edge detector 171 has detected a rising edge, the comparator 186 acquires a count value CF_VAL of the counter 172 at that time and the value of the rising edge register 173 and calculates the pulse period of the PWM signal 166, based on the acquired values. Further, the comparator 186 compares the value of the calculated pulse period and the value of the pulse period register 183 and outputs the result of comparison to the status register 162. The calculation of the pulse period is carried out by, for example, subtracting the value of the rising edge register 173 from the count value CF_VAL obtained on the rising edge. When the comparator 186 receives an instruction for execution of a comparison process outputted when the edge detector 171 has detected a falling edge, the comparator 186 acquires a count value CF_VAL of the counter 172 at that time and the value of the rising edge register 173 and calculates the pulse width of the PWM signal 166, based on the acquired values. Further, the comparator 186 compares the value of the calculated pulse width and the value of the pulse width buffer 185 and outputs the result of comparison to the status register 162. The calculation of the pulse width is carried out by, for example, subtracting the value of the rising edge register 173 from the count value CF_VAL obtained on the falling edge.

Figure 6:
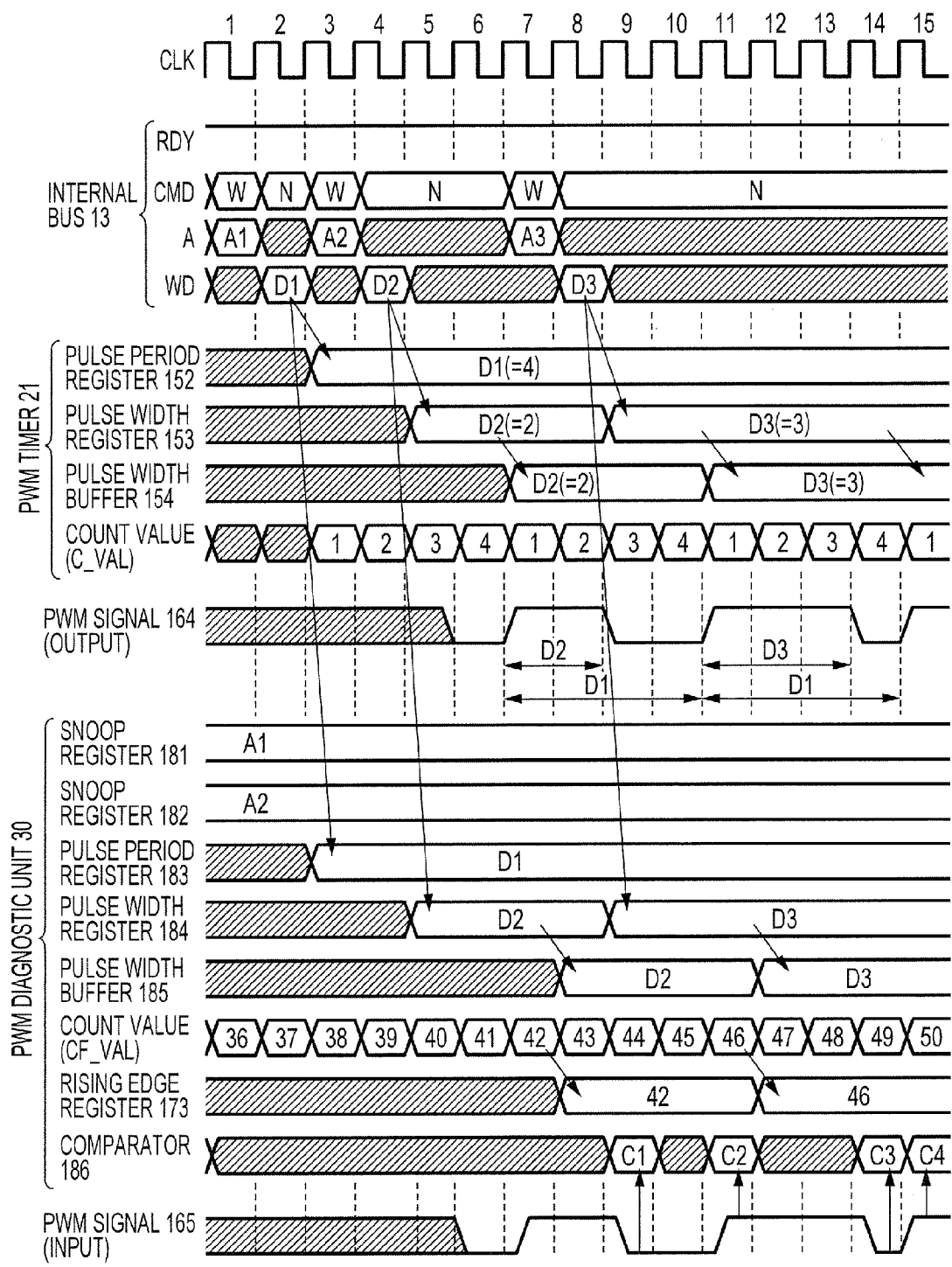
FIG. 6 is a timing chart depicting one example illustrative of operation timings of a PWM timer 21 and a PWM signal diagnostic unit 30.

FIG. 6 is a timing chart showing one example illustrative of operation timings of the PWM timer 21 and the PWM signal diagnostic unit 30. Assume that the setting of pulse outputting has been made to the control register 151 and the pulse selector 159 selects and outputs a PWM signal 164 in the same drawing as with FIGS. 2 and 4. Also assume that an address (A1) of the pulse period register 152 in the PWM timer 21 is written into the snoop register 181 of the PWM signal diagnostic unit 30, and an address (A2) of the pulse width register 153 in the PWM timer 21 is written into the snoop register 182. Incidentally, a clock signal CLK is assigned numbers indicative of clock cycles in the same drawing.

In the same drawing, each timing provided to generate the PWM signal 164 is similar to FIGS. 2 and 4. When a command signal W and an address A1 are outputted onto the internal bus 13 in a clock cycle 1, the register control circuit 170 acquires write data D1 (=4) outputted in the next clock cycle 2 and writes the write data D1 into the pulse period register 183 in a clock cycle 3. When a command signal W and an address A2 are outputted onto the internal bus 13 in the clock cycle 3, the register control circuit 170 acquires write data D2 (=2) outputted in the next clock cycle 4 and writes the write data D2 into the pulse width register 184 in a clock cycle 5. Thus, the same condition as the generation condition set to the PWM timer 21 is set to the PWM signal diagnostic unit 30.

When the edge detector 171 detects the rising edge of the PWM signal 164 in a clock cycle 7, a count value CF_VAL (=42) of the counter 172 is written into the rising edge register 173, and the value of the pulse width register 183 is written into the pulse width buffer 185 in the next clock cycle 8. Thereafter, when the edge detector 171 detects the falling edge of the PWM signal 164 in a clock cycle 9, the comparator 186 calculates a pulse width and performs a comparison process C1 for comparing the result of comparison and the value of the pulse width buffer 185. In the case of the same drawing, a value (=2) obtained by subtracting the value (=42) of the rising edge register 173 from a count value CF_VAL (=44) at the detection of the falling edge becomes the value of the pulse width of the PWM signal 164 and coincides with the value D2 (=2) of the pulse width buffer 185.

Thereafter, when the edge detector 171 detects the rising edge of the PWM signal 164 in a clock cycle 11, the comparator 186 calculates a pulse period thereof and performs a comparison process C2 for comparing the result of comparison and the value of the pulse period register 183. In the case of the same drawing, a value (=4) obtained by subtracting the value (=42) of the rising edge register 173 from a count value CF_VAL (=46) at the detection of the rising edge becomes the value of the pulse period of the PWM signal 164 and coincides with the value D1 (=4) of the pulse period register 183. In the next clock cycle 12 during which the edge detector 171 detects the rising edge of the PWM signal 164, the count value CF_VAL (=46) of the counter 172 is written into the rising edge register 173. By the same method as described above, a process for comparison with respect to a pulse width is performed in a cock cycle 14, and a process for comparison with respect to a pulse period is carried out in a clock cycle 15.

According to the microcontroller 3 according to the third embodiment as described above, a more detailed failure decision of the PWM timer 21 can be carried out without increasing the processing load of the CPU 11. The microcontroller 3 can have each expected value of the PWM signal independent of the pulse period register 152, pulse width register 153 and pulse width buffer 154 provided in the PWM timer 21 due to the provision of the pulse period register 183, pulse width register 184 and pulse width buffer 185 within the PWM signal diagnostic unit 30. It is possible to improve reliability more than the PWM signal diagnostic unit 20 according to the second embodiment. Although there is a need to perform a process for writing to the registers 183 through 185 by the CPU 11 due to the provision of the registers 183 through 185 within the independent PWM signal diagnostic unit 30, the PWM signal diagnostic unit 30 is provided with the snoop function according to the microcontroller 3. There is therefore no need to perform the process for writing to the registers 183 through 185 by the CPU 11, and an increase in the processing load of the CPU 11 can be suppressed.

Fourth Embodiment

Figure 7:
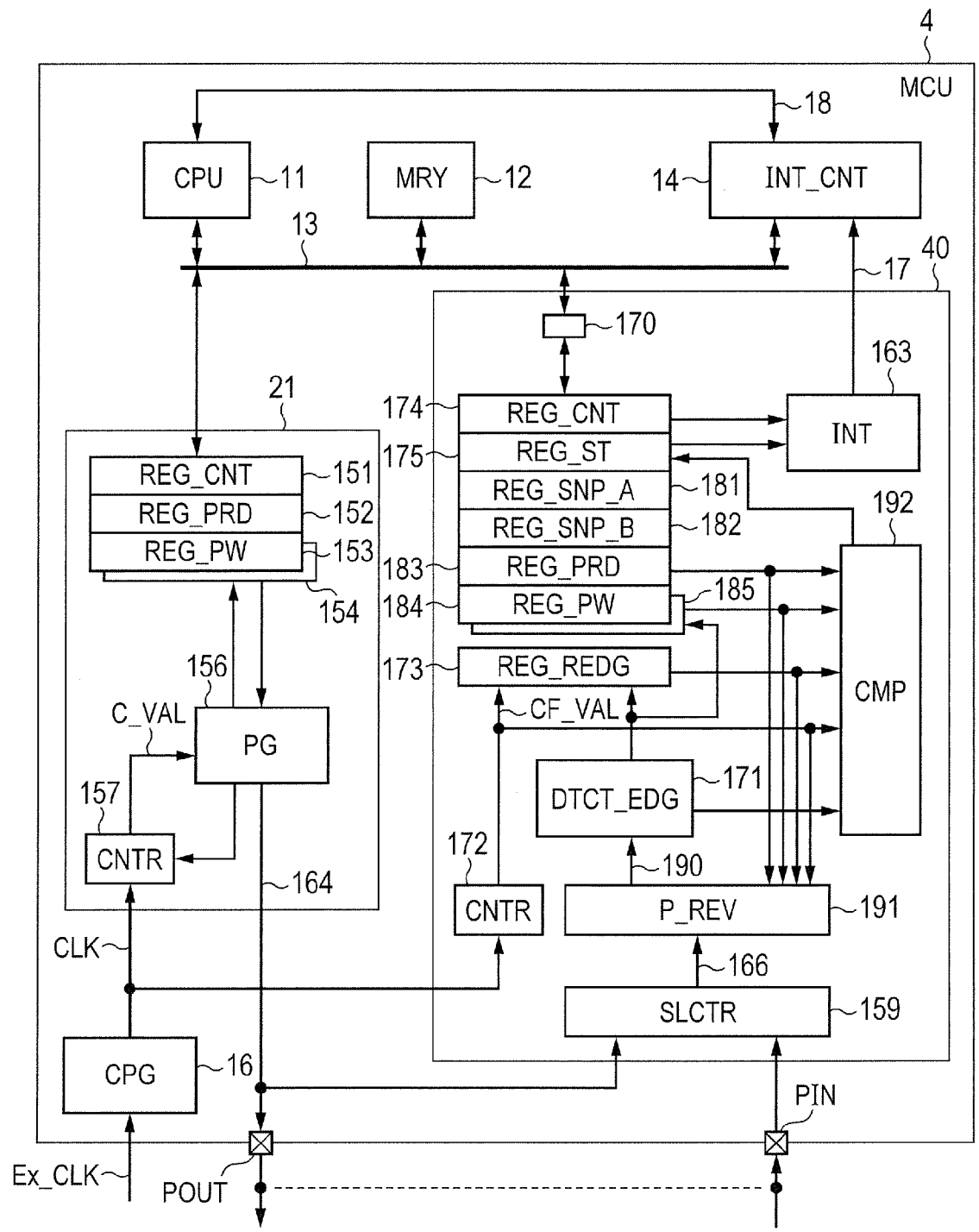
FIG. 7 is a block diagram illustrating one example of a microcontroller equipped with a PWM timer function and its diagnostic function, according to a fourth embodiment.

FIG. 7 is a block diagram showing one example of a microcontroller equipped with a PWM timer function and its diagnostic function, according to a fourth embodiment. In the same drawing, the same reference numerals are respectively attached to the same components as those in the microcontrollers 1 through 3, and their detailed description will be omitted.

The microcontroller 4 shown in the same drawing is capable of diagnosing a PWM signal even when duty ratios 0% and 100% are set as conditions for the generation of a PWM signal.

Figure 8:
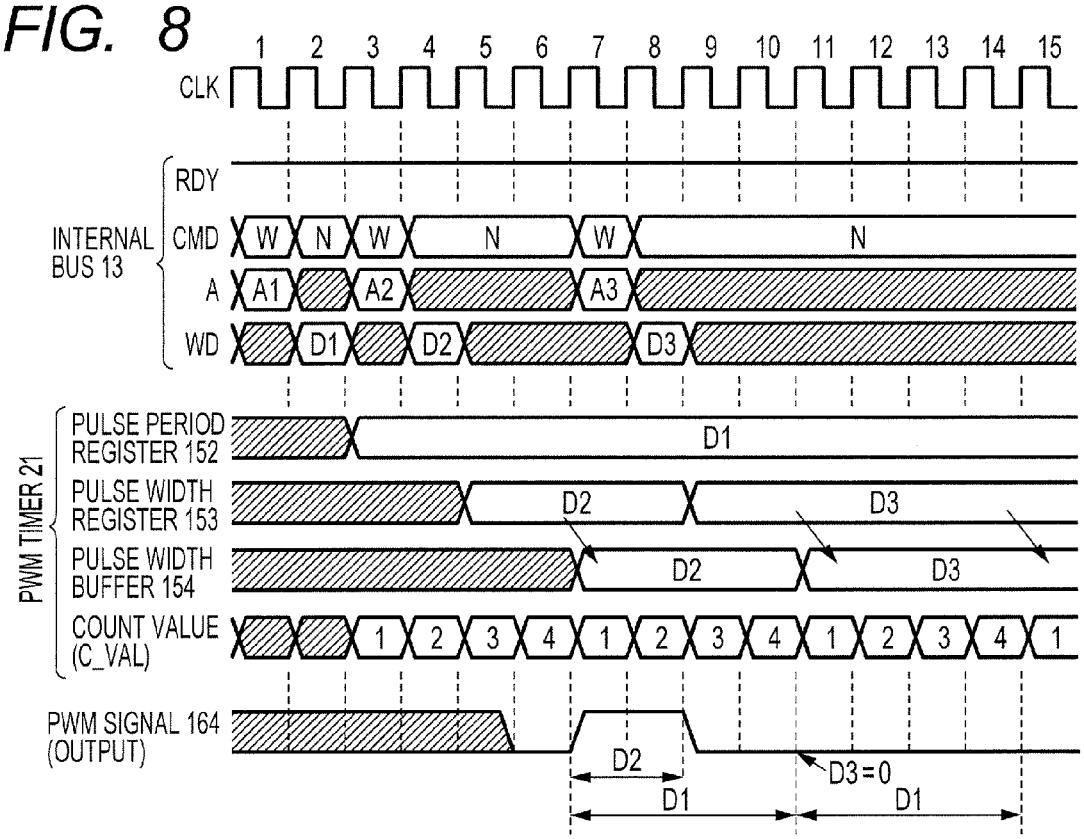
FIG. 8 is a timing chart showing one example illustrative of operation timings where a PWM signal having a duty ratio of 0% is generated.

When the pulse width of the PWM signal is 0 (zero) (in the case of the duty ratio 0%), signal levels lying during one period of the PWM signal are all brought to a low level, so that no rising edge occurs between the present PWM signal and the immediately preceding PWM signal. FIG. 8 illustrates by way of example where the PWM signal of the duty ratio 0% is generated.

The same drawing shows changes in the PWM signal where a pulse period D1 (=4) is set to the pulse period register 152 in the PWM timer 21 and a pulse width set to the pulse width register 153 is changed from D2 (=2) to D3 (=0). Since, in this case, the PWM signal 164 does not rise in a clock cycle 11 during which the value D3 of the pulse width register 153 is set to the pulse width buffer 154, the pulse width of the PWM signal 164 becomes zero in the clock cycles 11 through 14.

Figure 9:
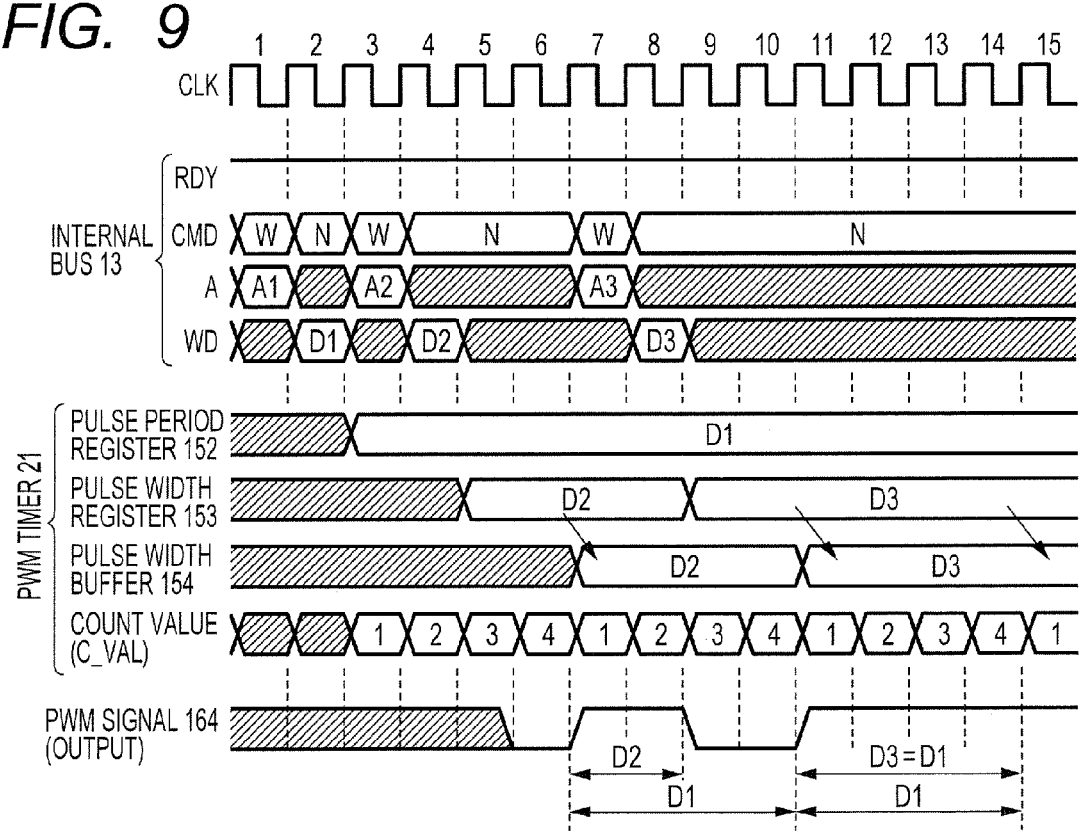
FIG. 9 is a timing chart showing one example illustrative of operation timings where a PWM signal having a duty ratio of 100% is generated.

When the pulse width and the pulse period coincide with each other (in the case of the duty ratio 100%), signal levels lying during one period of the PWM signal are all brought to a high level, so that no falling edge occurs between the present PWM signal and the next-generated PWM signal. FIG. 9 illustrates by way of example where the PWM signal of the duty ratio 100% is generated.

The same drawing shows changes in the PWM signal where a pulse period D1 (=4) is set to the pulse period register 152 in the PWM timer 21 and a pulse width set to the pulse width register 153 is changed from D2 (=2) to D3 (=4). Since, in this case, the PWM signal 164 rises and thereafter does not fall in a clock cycle 11 during which the value D3 of the pulse width register 153 is set to the pulse width buffer 154, no pulse occurs in a clock cycle 15.

As described above, since no edge occurs in the PWM signal when the duty ratio of the PWM signal is 0% or 100%, it is difficult to diagnose the PWM signal. Thus, the PWM signal diagnostic unit 40 according to the fourth embodiment is equipped with a pulse correction circuit (P_REV) 191 in addition to the components of the PWM signal diagnostic unit 30 according to the third embodiment. The PWM signal diagnostic unit 40 corrects the PWM signal by means of the pulse correction circuit 191 and performs a diagnostic process based on the post-correction PWM signal 190.

The pulse correction circuit 191 monitors a pulse period register 183, a pulse width register 184 and a pulse width buffer 185. The pulse correction circuit 191 corrects a PWM signal 166 outputted from a pulse selector 159 according to conditions for the generation of a PWM signal set to each of these and thereby outputs the same to an edge detector 171. For example, when the pulse width set to the pulse width register 184 is zero, and the pulse width set to the pulse width buffer 185 and the pulse period set to the pulse period register 183 coincide with each other, the pulse correction circuit 191 outputs the corrected signal of the input PWM signal 166 as a PWM signal 190. When a condition other than the two generation conditions is set, the pulse correction circuit 191 outputs the input PWM signal 166 as the PWM signal 190 without its correction.

Figure 10:
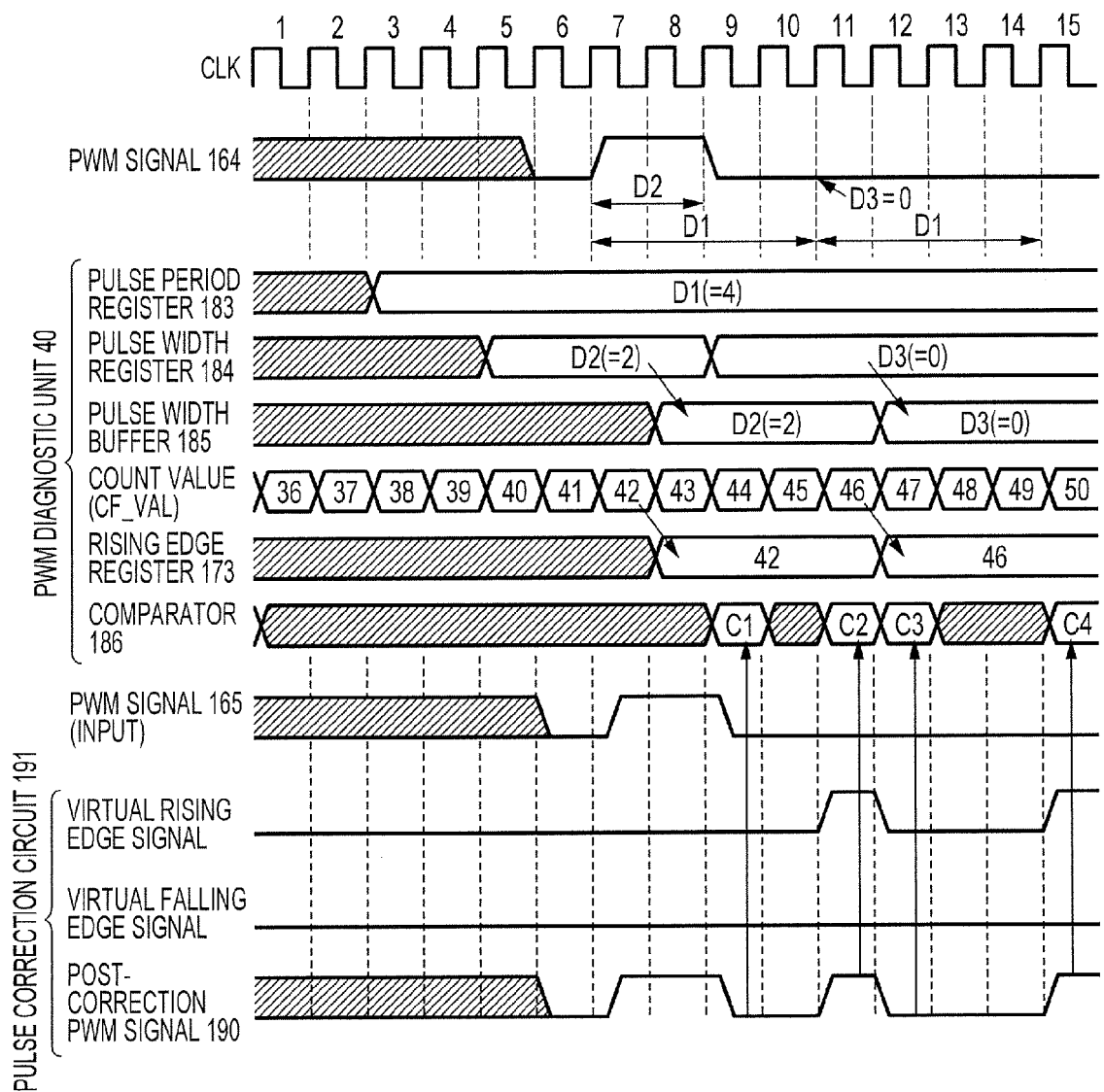
FIG. 10 is a timing chart showing one example illustrative of operation timings of a PWM signal diagnostic unit 40 where a diagnosis on a PWM signal having a duty ratio of 0% is carried out.
Figure 11:
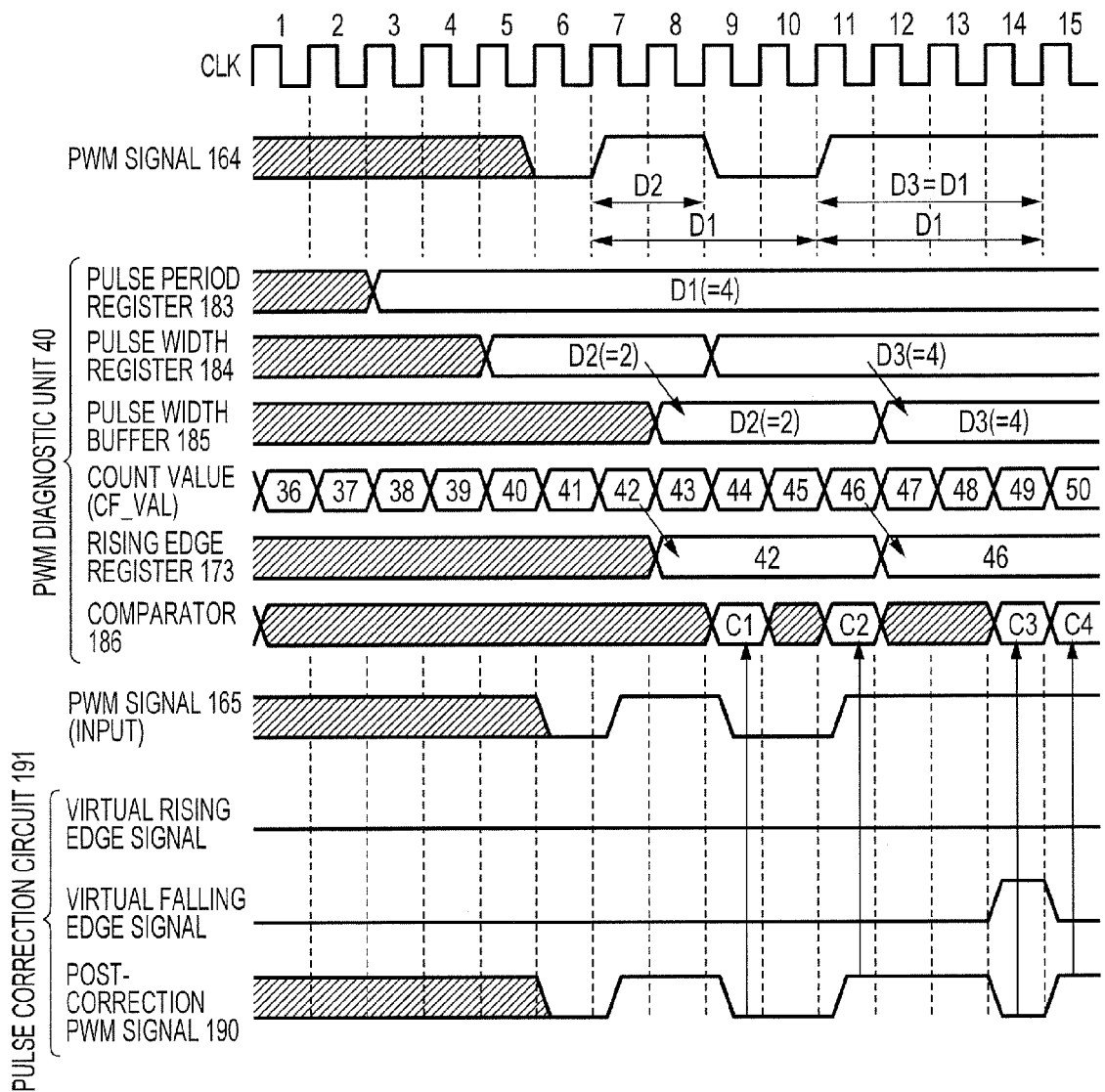
FIG. 11 is a timing chart showing one example illustrative of operation timings of the PWM signal diagnostic unit 40 where a diagnosis on a PWM signal having a duty ratio of 100% is carried out.

A method of correcting the PWM signal by the pulse correction circuit 191 will concretely be explained using FIGS. 10 and 11.

FIG. 10 is a timing chart showing one example illustrative of operation timings of the PWM signal diagnostic unit 40 where a PWM signal having a duty ratio 0% is diagnosed. Assume that the setting of pulse outputting has been made to the control register 151 and the pulse selector 159 selects and outputs a PWM signal 164 in the same drawing as with FIG. 6. Also assume that an address (A1) of the pulse period register 152 in the PWM timer 21 is written into its corresponding snoop register 181 of the PWM signal diagnostic unit 40, and an address (A2) of the pulse width register 153 in the PWM timer 21 is written into its corresponding snoop register 182.

As shown in the same drawing, in accordance with the snoop function, a pulse period D1 (=4) is set to the pulse period register 183 in a clock cycle 3, and a pulse width D2 (=2) is set to the pulse width register 184 in a clock cycle 5. In the case of this generation condition, the pulse correction circuit 191 does not correct the input PWM signal 164. That is, the pulse correction circuit 191 outputs the PWM signal 164 as a PWM signal 190 during a period from a clock cycle 7 to a clock cycle 10.

Thereafter, when a pulse width D3 (=0) is set to the pulse width register 184 in the clock cycle 9, the pulse correction circuit 191 generates a virtual rising edge signal in a timing (clock cycle 11) at which one period has elapsed from the rising edge (clock cycle 7) of a PWM signal having an immediately preceding period. Described specifically, when a value obtained by adding the value of the rising edge register 173 and the value of the pulse period register 183 coincides with a count value CF_VAL, the pulse correction circuit 191 generates a virtual falling edge signal. For example, since the value (=46) obtained by adding the value (=42) of the rising edge register 173 and the value (=4) of the pulse period register 183, and the count value CF_VAL (=46) coincide with each other in the clock cycle 11, the pulse correction circuit 191 generates the virtual rising edge signal at this timing. The same drawing shows an example in which the pulse width of the virtual rising edge signal is assumed to be a pulse width corresponding to one clock cycle of the clock signal CLK. There is an advantage that since the pulse width of the virtual rising edge signal is set to the pulse width corresponding to one clock cycle of the clock signal CLK although, if the virtual rising edge signal is of a signal that rises with the above timing, its pulse width is not limited in particular, it becomes easy to generate the virtual rising edge signal, thereby making it possible to simplify the configuration of the pulse correction circuit 191.

The pulse correction circuit 191 outputs a signal of logical ORing of the virtual rising edge signal generated by the above method and the input PWM signal 164 as a PWM signal 190. That is, a PWM signal 190 is generated which is brought to a high level by one clock cycle with the timing of the clock cycle 11 during one period from the clock cycles 11 to 14. A similar correction is performed even at the timing of a subsequent clock cycle 15. Thus, even when the PWM signal 164 of the duty ratio 0% is generated, edge detection can be carried out using the post-correction PWM signal 190.

FIG. 11 is a timing chart showing one example illustrative of operation timings of the PWM signal diagnostic unit 40 where a PWM signal having a duty ratio 100% is diagnosed. In the same drawing, as with FIG. 10, the setting of pulse outputting is assumed to be made to the control register 151, and the pulse selector 159 is assumed to select and output a PWM signal 164. Also assume that the address (A1) of the pulse period register 152 in the PWM timer 21 is written into its corresponding snoop register 181 of the PWM signal diagnostic unit 40, and the address (A2) of the pulse width register 153 in the PWM timer 21 is written into its corresponding snoop register 182.

The operation timings up to the clock cycle 8 are similar to FIG. 10 as shown in the same drawing. When a pulse width D3 (=4) is set to the pulse width register 184 in the clock cycle 9, the pulse correction circuit 191 generates a virtual falling edge signal in a timing (clock cycle 10) at which a period shorter than a pulse period has elapsed from the timing (clock cycle 11) of the rising edge of the next PWM signal 164. Described concretely, when a value obtained by subtracting only "1 (corresponding to one clock cycle)" from a value obtained by adding the value of the rising edge register 173 and the value of the pulse period register 183, and a count value CF_VAL coincide with each other, the pulse correction circuit 191 generates the virtual falling edge signal. For example, when a value (=49) obtained by subtracting only "1" from an added value (=50) of the value (=46) of the rising edge register 173 and the value (=4) of the pulse period register 183 coincides with a count value (=49) in the clock cycle 14, the pulse correction circuit 191 generates the virtual falling edge signal at this timing. The value "1 (corresponding to one clock cycle) to be subtracted is a value that defines the pulse width of the virtual falling edge signal. If the virtual falling edge signal is generated before one period of the PWM signal 164 of the duty ratio 100% elapses although the value to be subtracted is defined as "1 (corresponding to one clock cycle) in the above-described example, the value thereof is not limited. That is, there is an advantage that since the pulse width is set as the pulse width corresponding to one clock cycle of the clock signal CLK although the pulse width of the virtual falling edge signal is not limited in particular, it becomes easy to generate a virtual falling edge signal, thereby making it possible to simplify the configuration of the pulse correction circuit 191.

The pulse correction circuit 191 generates an inverted signal of the virtual falling edge signal generated by the above method and outputs as a PWM signal 190, a signal obtained by ANDing the inverted signal and the input PWM signal 164. That is, a PWM signal 190 brought to a low level by one clock cycle is generated with the timing of the clock cycle 14. Thus, even when the PWM signal 164 of the duty ratio 100% is generated, edge detection can be performed using the post-correction PWM signal 190.

When the edge detector 171 detects the rising edge of the PWM signal 190 output from the pulse correction circuit 191 as with the third embodiment, the edge detector 171 instructs the rising edge register 173 to write the count value CF_VAL of the counter 172 and instructs the comparator 186 to execute a comparison process. Likewise, even where the rising edge of the PWM signal 190 is detected, the edge detector 171 instructs the comparator 186 to execute a comparison process.

The comparator 192 monitors the pulse period register 183, the pulse width register 184 and the pulse width buffer 1985. When conditions other than the two generation conditions (duty ratio 0% and duty ratio 100%) are set, the comparator 192 executes a comparison process by a method similar to the third embodiment and outputs the result of comparison to the status register 162.

On the other hand, the content of processing of the comparator 192 is as follows where the generation condition (the value of the pulse width register 184 is zero) for the duty ratio 0% is set. When the edge detector 171 detects the rising edge of the PWM signal 190, the comparator 192 calculates a pulse period and performs a comparison process for comparing the result of calculation and the value of the pulse period register 152. In the case of FIG. 10, a value (=4) obtained by subtracting the value (=42) of the rising edge register 173 from a count value CF_VAL at the detection of the rising edge is taken as the value of the pulse width of the PWM signal 164 in the clock cycle 11. The comparator 192 therefore determines whether the thus-subtracted value (=4) and the value D1 (=4) of the pulse period register 183 coincide with each other. When the edge detector 171 detects the falling edge of the PWM signal 190, the comparator 192 calculates a pulse width and performs a comparison process for comparing the result of calculation and the value of the pulse period register 152. In a clock cycle 12 in the case of FIG. 10, for example, the comparator 192 determines whether a value (=1) obtained by subtracting the value (=46) of the rising edge register 173 from a count value CF_VAL (=47) at the detection of the falling edge coincides with a value obtained by adding "+1" to a value D3 (=0) of the pulse width buffer 185. That is, a comparison process is carried out in consideration of the fact that the PWM signal 164 of the duty ratio 0% is corrected to the PWM signal 190 brought to the pulse width corresponding to one clock cycle by the correction of the PWM signal by the pulse correction circuit 190. It is thus possible to determine whether the PWM signal 164 having the duty ratio 0% is generated according to the generation condition.

The content of processing of the comparator 192 where the generation condition (the value of the pulse width register 183 is zero) for the duty ratio 100% is set is as follows: In this case, when the edge detector 171 detects the rising edge of the PWM signal 190, the comparator 192 calculates a pulse period and performs a comparison process for comparing the result of calculation and the value of the pulse period register 152. In the case of FIG. 11, for example, a value (=4) obtained by subtracting the value (=42) of the rising edge register 173 from a count value CF_VAL (=46) at the detection of the rising edge is taken as the pulse period of the PWM signal 164 in a clock cycle 11. The comparator 192 therefore determines whether the calculated value (=4) and the value D1 (=4) of the pulse period register 183 coincide with each other. When the edge detector 171 detects the falling edge of the PWM signal 190, the comparator 192 calculates a pulse width and performs a comparison process for comparing the result of calculation and the value of the pulse period register 152. In a clock cycle 14 in the case of FIG. 11, for example, the comparator 192 determines whether a value (=3) obtained by subtracting the value (=46) of the rising edge register 173 from a count value CF_VAL (=49) at the detection of the falling edge coincides with a value obtained by adding "−1" to a value D3 (=4) of the pulse width buffer 185. That is, a comparison process is carried out in consideration of the fact that the PWM signal 164 of the duty ratio 100% is corrected to a PWM signal 190 brought to a pulse width corresponding to three clock cycles by the correction of the PWM signal by the pulse correction circuit 190. It is thus possible to determine whether the PWM signal 164 having the duty ratio 100% is generated according to the generation condition.

According to the microcontroller 4 according to the fourth embodiment as described above, a more detailed failure decision of the PWM timer 21 can be carried out without increasing the processing load of the CPU 11 as with the first through third embodiments. An increase in the processing load of the CPU 11 can be suppressed by the snoop function while securing independence of a target for diagnosis of the PWM signal diagnostic unit 40. Further, according to the microcontroller 4, the diagnosis of the output of the PWM timer 21 is enabled even under the condition free of the occurrence of a pulse edge by the provision of the pulse correction circuit 191, thereby making it possible to improve a fault detection rate and achieve a further improvement in reliability.

Fifth Embodiment

Figure 12:
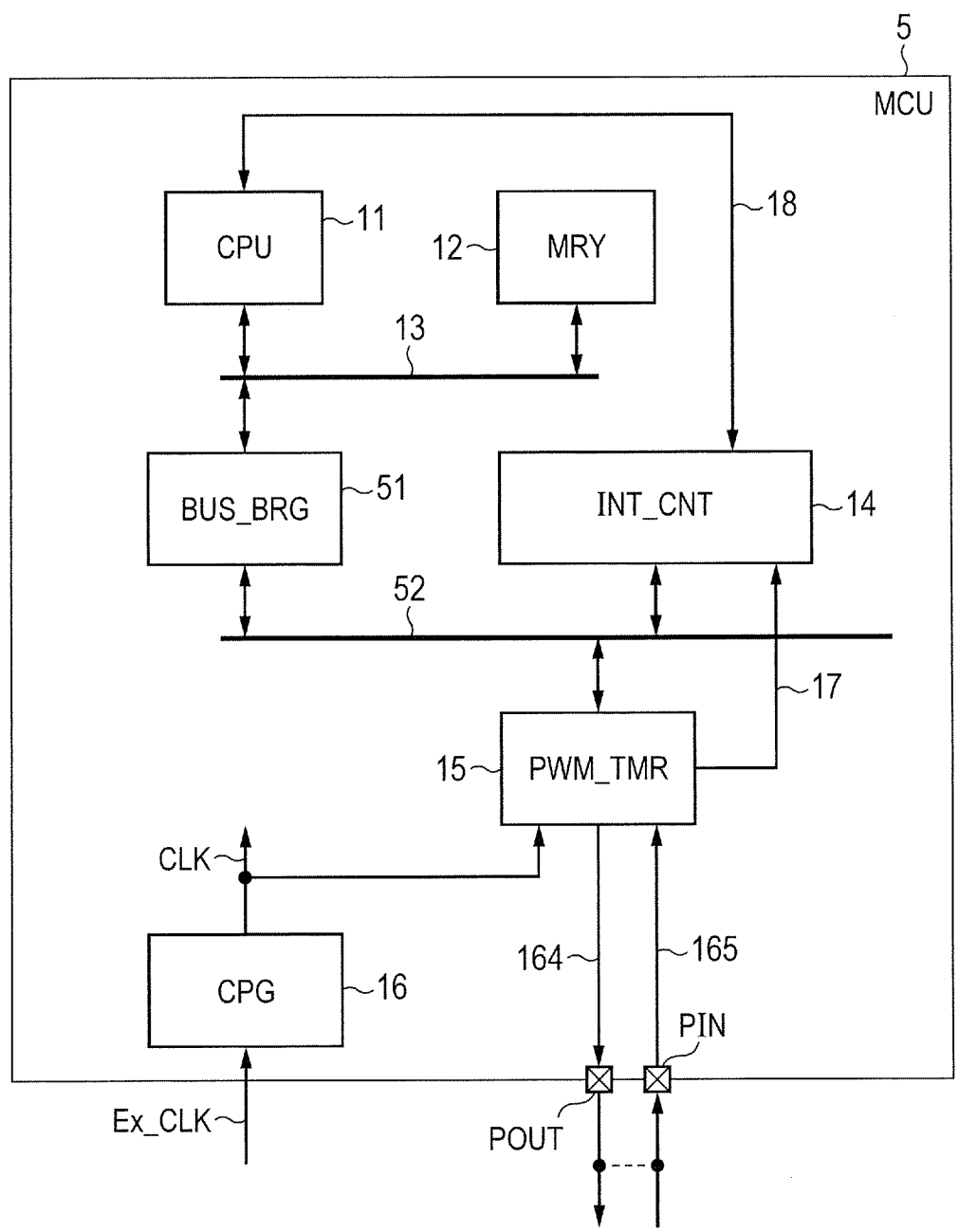
FIG. 12 is a block diagram showing one example of a microcontroller equipped with a PWM timer function and its diagnostic function, according to a fifth embodiment.

FIG. 12 is a block diagram showing one example of a microcontroller equipped with a PWM timer function and its diagnostic function, according to a fifth embodiment. In the same drawing, the same reference numerals are respectively attached to the same components as those in the microcontrollers 1 through 4, and their detailed description will be omitted.

The microcontroller 5 shown in the same drawing has two buses of an internal bus 13 and a system bus 52. A PWM timer is coupled to the system bus 52. Here, the PWM timer is of the PWM timer 15 equipped with the diagnostic function according to the first embodiment. The system bus 52 operates in a low speed bus clock (low speed clock). An interrupt controller 14, the PWM timer 15 and a bus bridge (BUS_BRG) 51 are coupled to the system bus 52. On the other hand, the internal bus 13 operates in a bus clock (high speed clock) faster than the system bus 52. A CPU 11, a memory 12 and the bus bridge 51 are coupled to the internal bus 13. The bus bridge 51 controls communications between a circuit coupled to the internal bus 13 and a circuit coupled to the system bus 52. Such a hierarchical bus configuration is effective particularly where the CPU 11 is operated at high speed. For example, when the CPU 11 accesses the peripheral circuit coupled to the system bus 52, the pipeline of the CPU 11 stops until its access is completed, thus causing wastage of processing. The larger the ratio in clock frequency between the internal bus 13 and the system bus 52 in particular, the more the number of needless cycles increases. Therefore, when the CPU 11 performs the process related to the diagnosis of the PWM timer as in the studied related art example described above, the wastage of processing increases, thus inhibiting the high-speed operation of the CPU 11. On the other hand, according to the microcontroller 5 according to the present embodiment, the processing related to the diagnosis of the PWM timer by the CPU 11 becomes unnecessary because the PWM timer 15 itself is provided with the diagnostic function, thus enabling the high-speed operation of the CPU 11. The hierarchical bus configuration allows the CPU 11 and the memory 12 to operate in a high speed clock and allows the peripheral circuits such as the PWM timer 15, the interrupt controller 14 and the like unnecessary to operate at high speed to operate in a slow clock, thereby making it possible to suppress power consumption of the entire microcontroller.

Sixth Embodiment

Figure 13:
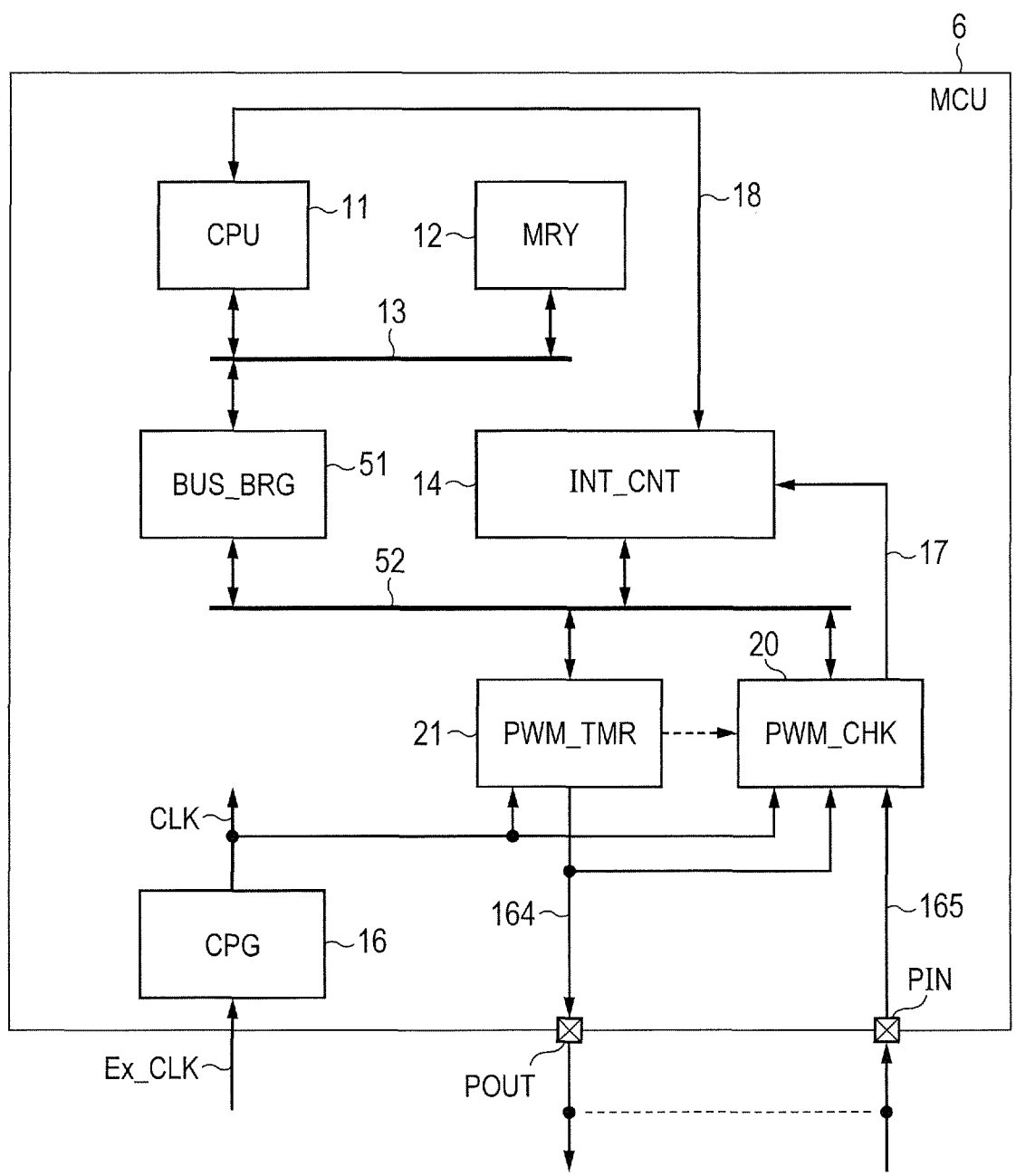
FIG. 13 is a block diagram showing one example of a microcontroller equipped with a PWM timer function and its diagnostic function, according to a sixth embodiment.

FIG. 13 is a block diagram showing one example of a microcontroller equipped with a PWM timer function and its diagnostic function, according to a sixth embodiment. In the same drawing, the same reference numerals are respectively attached to the same components as those in the microcontrollers 1 through 5, and their detailed description will be omitted.

The microcontroller 6 shown in the same drawing has two buses of an internal bus 13 and a system bus 52 as with the microcontroller 5 according to the fifth embodiment. A PWM timer and a PWM signal diagnostic unit are coupled to the system bus 52. The PWM timer 21 in the second embodiment can be applied as the PWM timer shown in the same drawing. Any of the PWM signal diagnostic units 20, 30 and 40 in the second through fourth embodiments can be applied as the PWM signal diagnostic unit. FIG. 13 typically shows as one example where the PWM signal diagnostic unit 20 is applied.

According to this, as with the fifth embodiment, it is possible to cause a CPU 11 to reduce a processing load related to the diagnosis of the PWM timer 21 and to suppress power consumption of the entire microcontroller. In particular, the setting of expected values for the pulse period and pulse width to the PWM signal diagnostic units 30 and 40 realized by the snoop function prevents the processing load related to the diagnosis of the CPU 11 from increasing.

Seventh Embodiment

Figure 14:
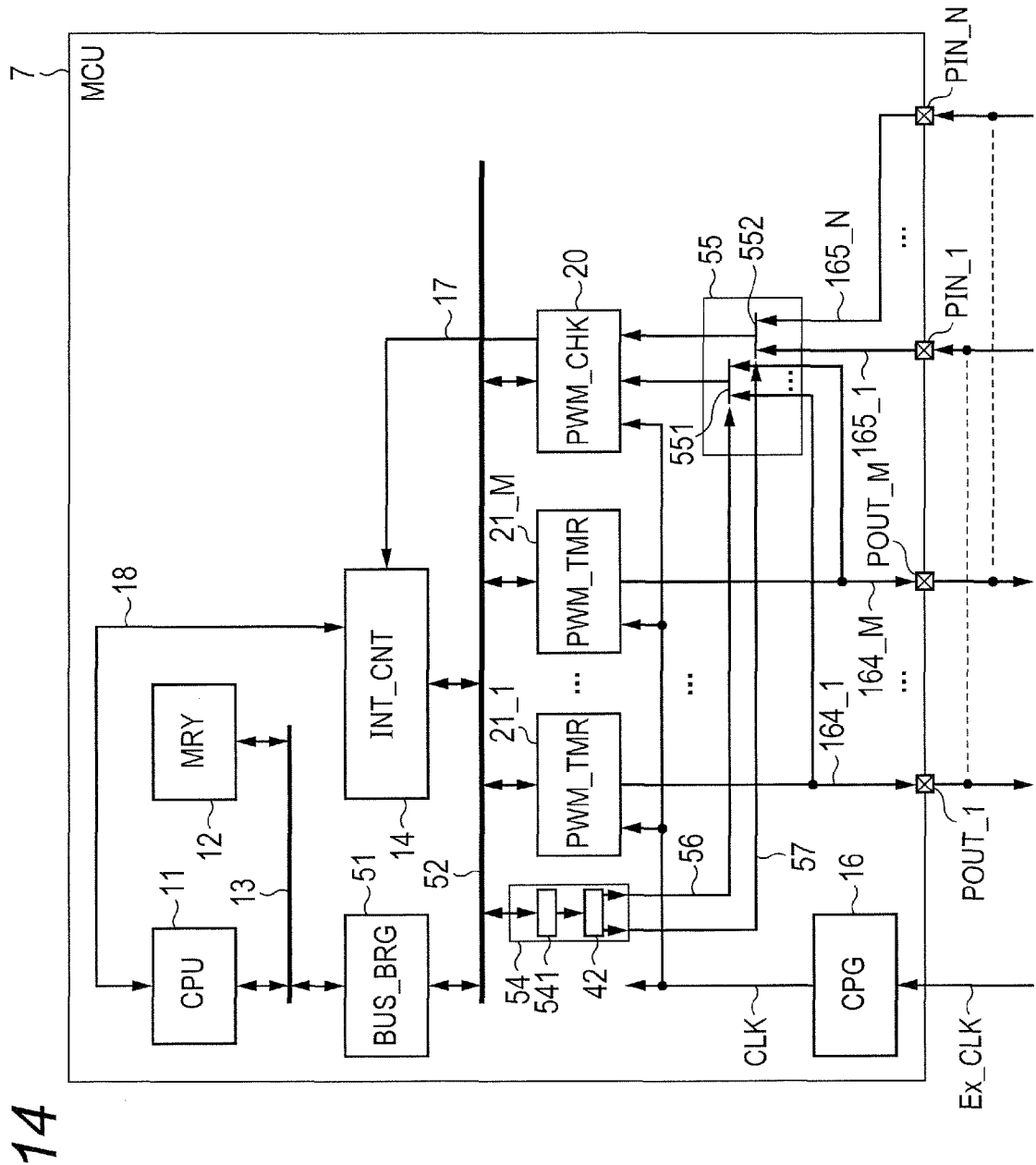
FIG. 14 is a block diagram depicting one example of a microcontroller equipped with a PWM timer function and its diagnostic function, according to a seventh embodiment.

FIG. 14 is a block diagram showing one example of a microcontroller equipped with a PWM timer function and its diagnostic function, according to a seventh embodiment. In the same drawing, the same reference numerals are respectively attached to the same components as those in the microcontrollers 1 through 6, and their detailed description will be omitted.

The microcontroller 7 shown in the same drawing has two buses of an internal bus 13 and a system bus 52 as with the microcontroller 6 according to the sixth embodiment. M (where M: integer greater than or equal to 2) PWM timers 21_1 through 21_M each used as a PWM signal generation unit for generating PWM signals, and a single PWM signal diagnostic unit are coupled to the system bus 52. As the PWM timers 21_1 through 21_M shown in the same drawing, the PWM timer 21 in the second embodiment can be applied. As the PWM signal diagnostic unit, any of the PWM signal diagnostic units 20, 30 and 40 used in the second through fourth embodiments can be applied. FIG. 14 typically shows as one example where the PWM signal diagnostic unit 20 is applied.

PWM signals 164_1 through 164_M respectively generated by the M PWM timers 21_1 through 21_M are outputted through M external output terminals POUT_1 through POUT_M. The microcontroller 7 has N (where N: integer greater than or equal to 1) external input terminals PIN_1 through PIN_N, which enable the input of PWM signals (external PWM signals) from the outside of the microcontroller.

The generated PWM signals 164_1 through 164_M and the external PWM signals 165_1 through 165_N are inputted to a selection unit 55. The selection unit 55 has, for example, a first selection circuit 551 and a second selection circuit 552. The first selection circuit 551 inputs the respective PWM signals 164_1 through 164_M therein, selects any of the input signals, based on a selection signal 56 and outputs the selected signal to the PWM signal diagnostic unit 20 as a PWM signal 164. The second selection circuit 552 inputs the respective external PWM signals 165_1 through 165_N therein, selects any of the input signals, based on a selection signal 57 and outputs the selected signal to the PWM signal diagnostic unit 20 as an external PWM signal 165. The selection signals 56 and 57 are signals for giving instructions as to which PWM signal should be selected and outputted, and are outputted from a diagnosis pulse selection instruction unit 54. The diagnosis pulse selection instruction unit 54 has a control register 541 reprogrammable or writable through the system bus 52. A signal generator 542 generates and outputs the selection signals 56 and 57 in accordance with the value set to the control register 541.

According to the present microcontroller 7, as with the second through fourth embodiments, a more detailed fault decision of the PWM timer can be done without increasing the processing load of the central processing unit. Since diagnosis can selectively be conducted by the single PWM signal diagnostic unit even where a plurality of PWM signals are generated, there is no need to provide diagnostic units depending on the number of generated PWM signals, thus contributing to a reduction in the area of the microcontroller.

Further, according to the microcontroller 7, for example, the external output terminals POUT_1 through POUT_M and the external input terminals PIN_1 through PIN_N are electrically coupled to one another outside the microcontroller so that the PWM signals 164_1 through 164_M generated by the PWM timers 21_1 through 21_M are respectively inputted via the external input terminals PIN_1 through PIN_N, thus making it possible to select and diagnose each input signal. According to this, it is also possible to diagnose whether the function of outputting the PWM signals from the external output terminals POUT_1 through POUT_M and the function of inputting the PWM signals from the external input terminals PIN_1 through PIN_N are normal.

Eighth Embodiment

Figure 15:
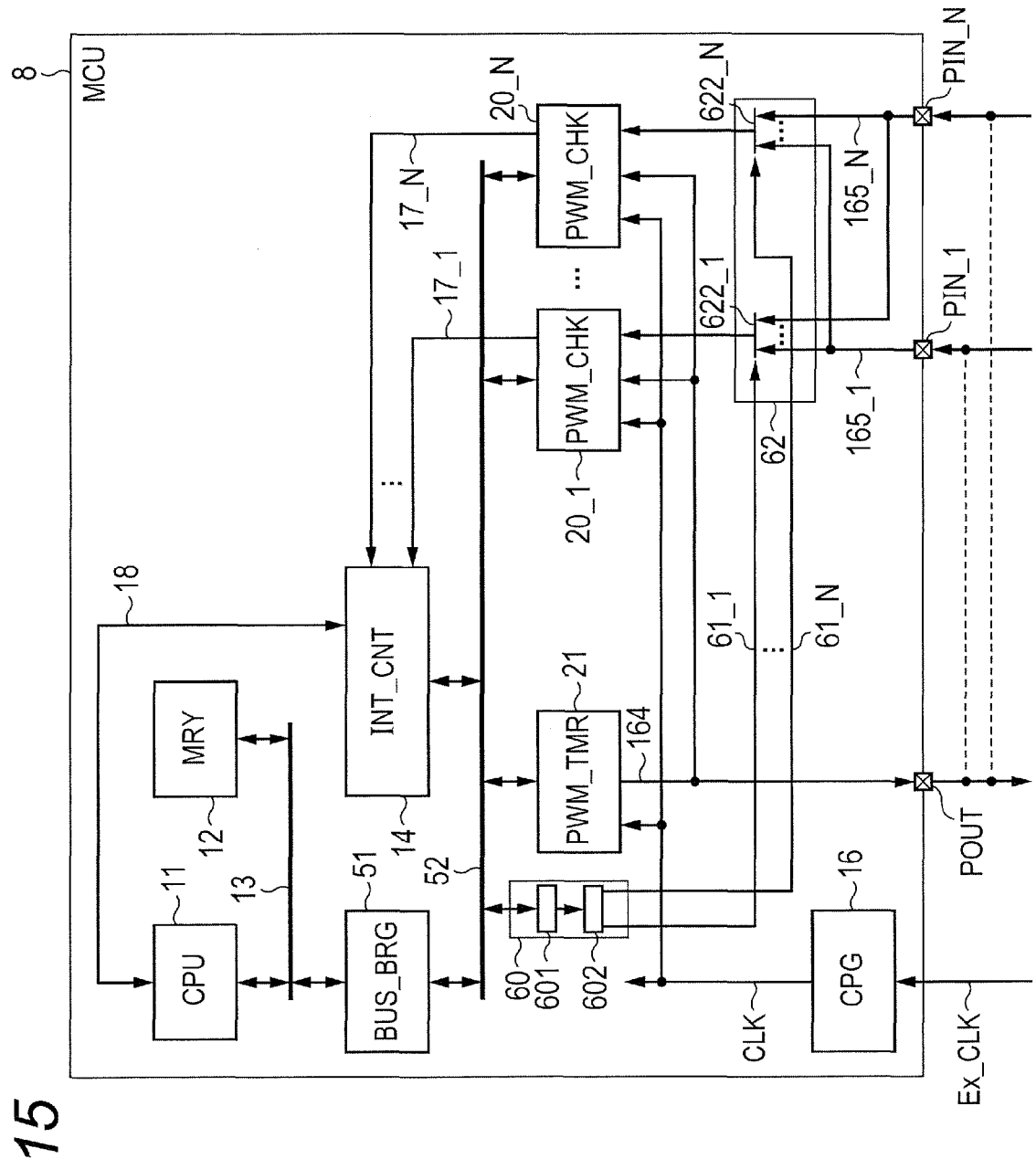
FIG. 15 is a block diagram showing one example of a microcontroller equipped with a PWM timer function and its diagnostic function, according to an eighth embodiment.

FIG. 15 is a block diagram showing one example of a microcontroller equipped with a PWM timer function and its diagnostic function, according to an eighth embodiment. In the same drawing; the same reference numerals are respectively attached to the same components as those in the microcontrollers 1 through 7, and their detailed description will be omitted.

The microcontroller 8 shown in the same drawing has two buses of an internal bus 13 and a system bus 52 as with the microcontroller 6. A single PWM timer 21 and N (where N: integer greater than or equal to 2) PWM signal diagnostic units are coupled to the system bus 52. As the PWM signal diagnostic unit shown in the same drawing, any of the PWM signal diagnostic units 20, 30 and 40 in the second through fourth embodiments can be applied. FIG. 15 typically shows as one example where the PWM signal diagnostic unit 20 is applied.

A PWM signal 164 generated by the PWM timer 21 is inputted to the PWM signal diagnostic units 20_1 through 20_N respectively and outputted to the outside of the microcontroller 8 via an external output terminal POUT. The microcontroller 8 has N external input terminals PIN_1 through PIN_N, which enable the input of PWM signals (external PWM signals) from the outside of the microcontroller. The external PWM signals 165_1 through 165_N are inputted to a selection unit 62. The selection unit 62 has, for example, N third selection circuits 622_1 through 622_N. The third selection circuits 622_1 through 622_N are provided in association with one another every 20_1 through 20_N of PWM signal diagnostic units. The PWM signal diagnostic units 20_1 through 20_N respectively input the external PWM signals 165_1 through 165_N therein and select any of the input signals, based on corresponding selection signals 61_1 through 61_N. Further, the PWM signal diagnostic units 20_1 through 20_N output the selected signal to their corresponding PWM signal diagnostic units 20_1 through 20_N as the external PWM signal 165. The selection signals 61_1 through 61_N are signals for giving instructions as to which external PWM signals 165_1 through 165_N should be selected and outputted, and are outputted from a diagnostic pulse selection circuit 60. The diagnostic pulse selection circuit 60 has a control register 601 reprogrammable or writable through the system bus 52. A signal generator 602 generates and outputs the selection signals 61_1 through 61_N in accordance with the value set to the control register 601.

According to the present microcontroller 7, as with the second through fourth embodiments, a more detailed fault decision of the PWM timer can be done without increasing the processing load of the central processing unit. Since one PWM signal can be diagnosed by a plurality of diagnostic units, the reliability of the result of diagnosis can be enhanced.

Further, according to the microcontroller 8, for example, the external output terminal POUT and the external input terminals PIN_1 through PIN_N are electrically coupled to one another outside the microcontroller so that the PWM signal 164 generated by the PWM timer 21 is inputted via the external input terminals PIN_1 through PIN_N, thus making it possible to select and diagnose the input signal. According to this, it is also possible to diagnose whether the function of outputting the PWM signal from the external output terminal POUT and the function of inputting the PWM signal from the external input terminals PIN_1 through PIN_N are normal.

Ninth Embodiment

Figure 16:
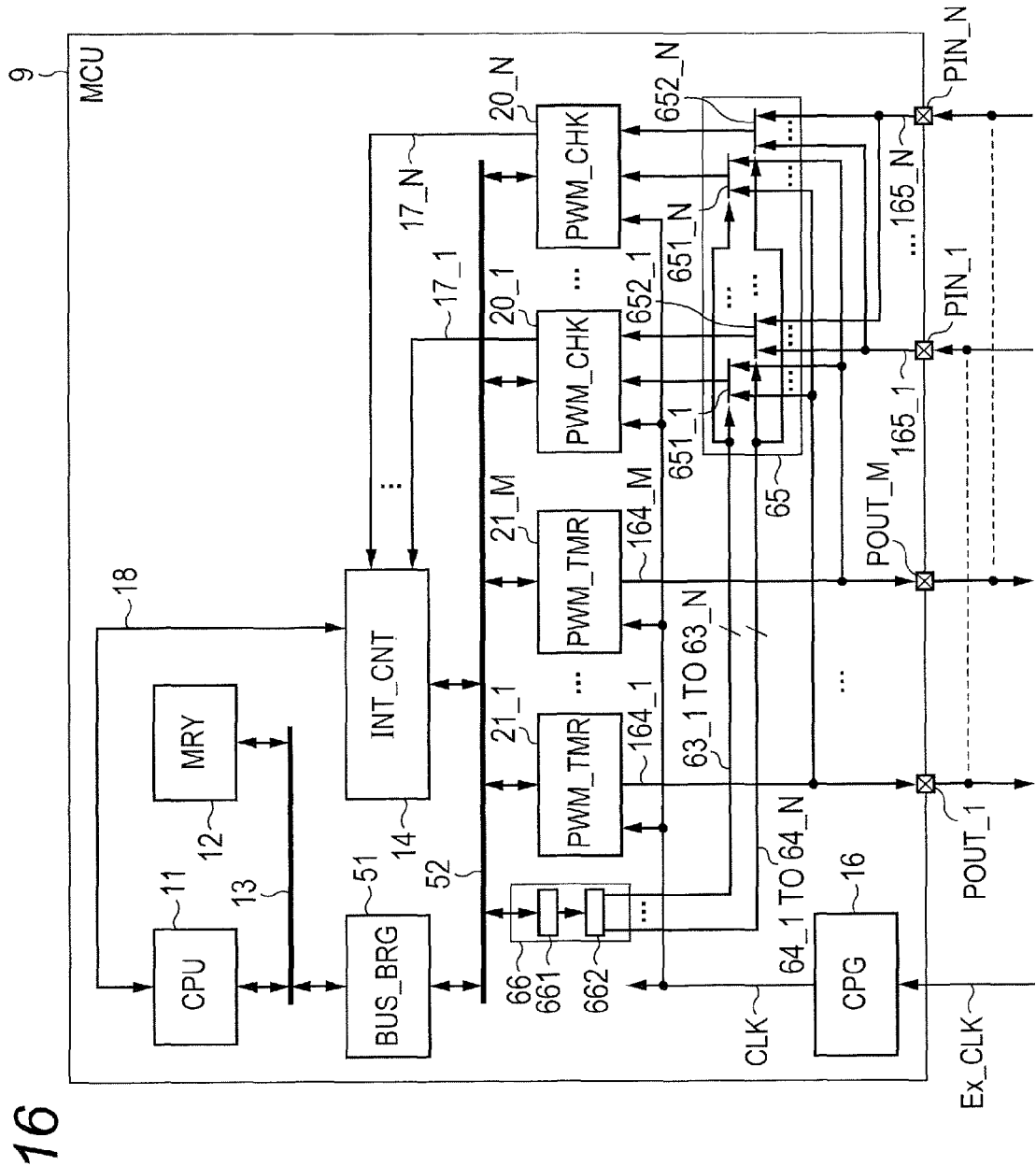
FIG. 16 is a block diagram illustrating one example of a microcontroller equipped with a PWM timer function and its diagnostic function, according to a ninth embodiment.

FIG. 16 is a block diagram showing one example of a microcontroller equipped with a PWM timer function and its diagnostic function, according to a ninth embodiment. In the same drawing, the same reference numerals are respectively attached to the same components as those in the microcontrollers 1 through 8, and their detailed description will be omitted.

The microcontroller 9 shown in the same drawing has two buses of an internal bus 13 and a system bus 52 as with the microcontroller 6. M PWM timers 21 used as PWM signal generation units for generating PWM signals, and N PWM signal diagnostic units used as diagnostic units for diagnosing the PWM timer function are respectively coupled to the system bus 52. As the PWM signal diagnostic unit shown in the same drawing, any of the PWM signal diagnostic units 20, 30 and 40 used in the second through fourth embodiments is applicable. FIG. 16 typically shows as one example where the PWM signal diagnostic unit 20 is applied.

PWM signals 164_1 through 164_M respectively generated by the M PWM timers 21_1 through 21_M are respectively outputted through M external output terminals POUT_1 through POUT_M. The microcontroller 9 has N (where N: integer greater than or equal to 1) external input terminals PIN_1 through PIN_N, which enable the input of PWM signals (external PWM signals) 165_1 through 165_N from the outside of the microcontroller.

The generated PWM signals 164_1 through 164_M and the external PWM signals 165_1 through 165_N are inputted to a selection unit 65. The selection unit 65 has, for example, fourth selection circuits 651_1 through 652_N and fifth selection circuits 652_1 through 652_N. The fourth selection circuits 651_1 through 651_N and the fifth selection circuits 652_1 through 652_N are provided in association with one another every 20_1 through 20_N of the PWM signal diagnostic units. For example, the fourth selection circuit 651_1 through 651_N respectively input the PWM signals 164_1 through 164M therein and select any of the input signals, based on their corresponding selection signals 63_1 through 63_N. Further, the fourth selection circuits 651_1 through 651_N outputs the selected signal to their corresponding PWM signal diagnostic units 20_1 through 20_N as a PWM signal 164. Likewise, the fifth selection circuits 652_1 through 652_N respectively input the external PWM signals 165_1 through 165_N therein, select any of the input signals, based on their corresponding selection signals 64_1 through 64_N, and output the selected signal to their corresponding PWM signal diagnostic units 20_1 through 20_N as an external PWM signal 165.

The selection signals 63_1 through 63_N are signals for giving instructions as to which PWM signals 164_1 through 164_N should be selected and outputted. The selection signals 64_1 through 64_N are signals for giving instructions as to which PWM signals 165_1 through 165_N should be selected and outputted. The selection signals 63_1 through 63_N and the selection signals 64_1 through 64_N are outputted from a diagnostic pulse selection instruction unit 66. The diagnostic pulse selection instruction circuit 66 has a control register 661 reprogrammable or writable through the system bus 52. A signal generator 662 generates and outputs the selection signals 63_1 through 63_N and the selection signals 64_1 through 64_N in accordance with the value set to the control register 661.

According to the present microcontroller 9, as with the second through fourth embodiments, a more detailed fault decision of the PWM timer can be done without increasing the processing load of the central processing unit. Since the combination of a target for diagnosis and a diagnostic subject can freely be determined according to the respective numbers of the PWM timers 21_1 through 21_M and the PWM signal diagnostic units 20_1 through 210-N, the degrees of freedom of system design and a diagnostic method increase.

Further, according to the microcontroller 9, the external output terminals POUT_1 through POUT_M and the external input terminals PIN_1 through PIN_N are electrically coupled to one another outside the microcontroller so that the PWM signals 1641 through 164_M generated by the PWM timers 21 are respectively inputted via the external input terminals PIN_1 through PIN_N, thus making it possible to select and diagnose each input signal. According to this, it is also possible to diagnose whether the function of outputting the PWM signals from the external output terminals POUT_1 through POUT_M and the function of inputting the PWM signals from the external input terminals PIN_1 through PIN_N are normal.

Tenth Embodiment

Figure 17:
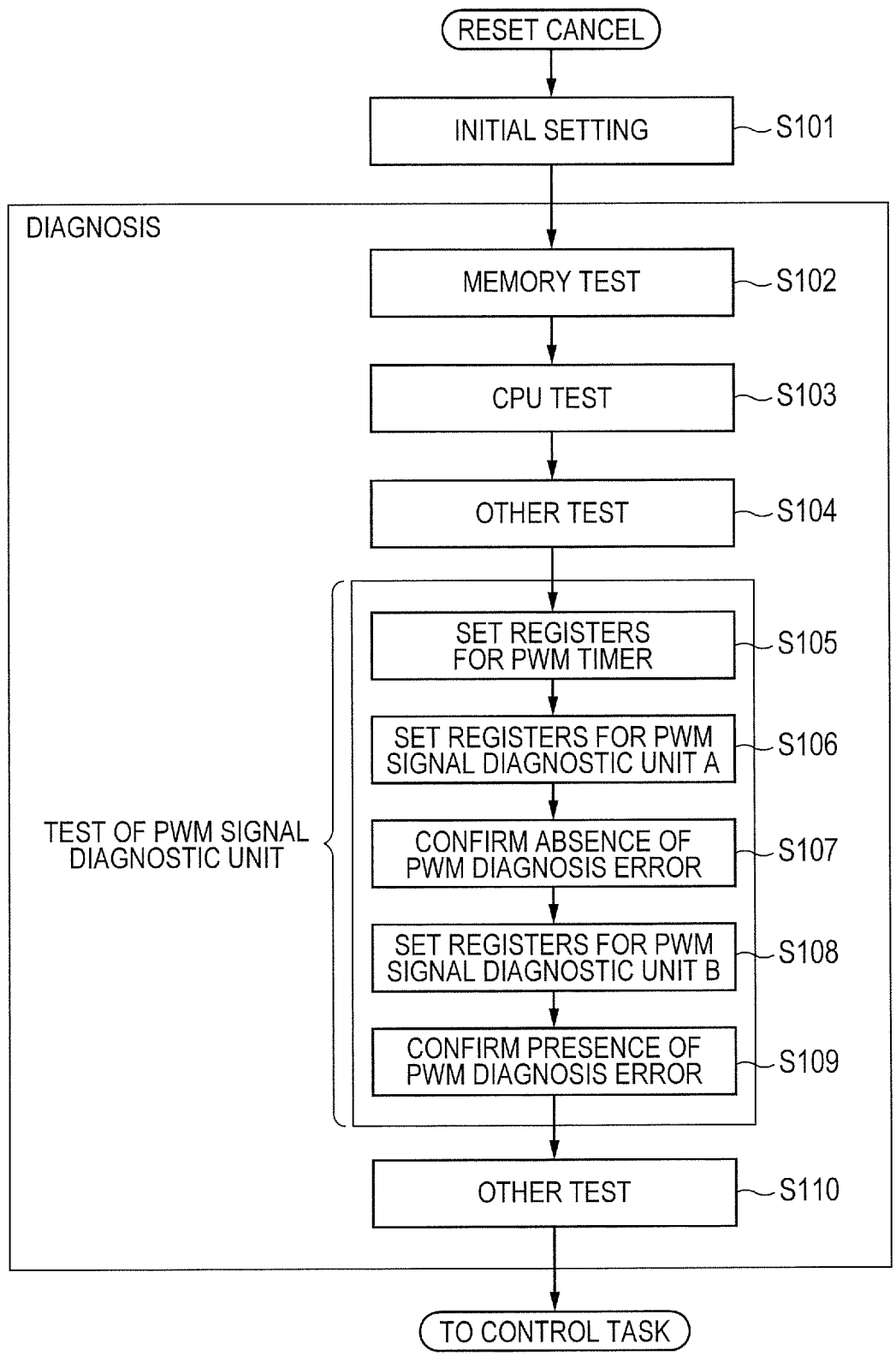
FIG. 17 is a flowchart showing one example of a diagnostic method of a diagnostic function for a PWM signal.

FIG. 17 is a flowchart showing one example of a diagnostic method of a diagnostic function for a PWM signal. For example, a PWM signal diagnostic unit target for diagnosis by the present diagnostic method corresponds to each of the PWM signal diagnostic units 30 and 40 shown in the second through ninth embodiments.

A diagnostic process for determining whether the PWM signal diagnostic unit is normal is included in, for example, a test process for confirming the operation of each of the various functional units in the microcontrollers 2 through 9 and is carried out before transition to the normal operation after a power-on reset, for example. The test process includes, e.g., a test on a memory 12, a test on a CPU 11 and a test on other functional units in addition to the test on the PWM timer.

A concrete processing flow where the test process is performed in the microcontroller 3 according to the third embodiment will typically be explained herein.

As shown in FIG. 17, when the microcontroller 3 is first powered up and the power-on reset is canceled, the initial settings of the respective functional units are performed (S101). Thereafter, a test process on each functional unit is started. The test on the memory 12 is first carried out in the test process (S102). Subsequently, the test on the CPU 11 is executed (S103). Next, the test on other functional units is performed (S104).

Thereafter, a test on the PWM signal diagnostic unit 30 is started. Upon the test on the PWM signal diagnostic unit 30, the CPU 11 first sets a generation condition (hereinafter also called a first generation condition) for generating, for example, a PWM signal having a first pulse period and a first pulse width to the registers 151 through 153 of the PWM timer 21 (S105). The values of the set first pulse period and pulse width are not limited in particular. Next, the CPU 11 accesses the PWM signal diagnostic unit 30 and thereby sets the first generation condition to the pulse period register 183 and the pulse width register 184 (S106). Then, the CPU 11 causes the PWM signal diagnostic unit 30 to execute a diagnostic process and confirms the result of its diagnosis (S107). When the result of diagnosis indicative of an error is outputted at Step 107, the CPU 11 determines that the PWM signal diagnostic unit is abnormal. If not so, then the CPU 11 determines that the PWM signal diagnostic unit is normal.

When the CPU 11 determines at Step 107 that the PWM signal diagnostic unit is normal, the CPU 11 accesses the PWM signal diagnostic unit 30 again and thereby sets a generation condition (hereinafter also called a second generation condition) for generating, for example, a PWM signal having a second pulse period and a second pulse width to the pulse period register 183 and the pulse width register 184 (S108). The second generation condition may be a generation condition different from the first generation condition, and the values of the second pulse width and the pulse period are not limited in particular. Then, the CPU 11 causes the PWM signal diagnostic unit 30 to execute a diagnostic process and confirms the result of its diagnosis (S109). When the result of diagnosis indicative of an error is outputted at Step 109, the CPU 11 determines that the PWM signal diagnostic unit is normal. If not so, then the CPU 11 determines that the PWM signal diagnostic unit is abnormal. When it is determined at Step 109 that the PWM signal diagnostic unit is normal, the CPU 11 make a transition to the test process on other functional units. When all the test processes are completed, the microcontroller 3 starts a normal operation.

According to this, it is possible to easily determine whether the PWM signal diagnostic unit itself operates normally. In particular, since the two of the diagnosis taken where the condition coincident with the generation condition set to the PWM timer is set to the PWM signal diagnostic unit, and the diagnosis taken where the condition different from the generation condition set to the PWM timer is set to the PWM signal diagnostic unit are performed, the accuracy of diagnosis on the PWM signal diagnostic unit can be enhanced. It is thus possible to improve not only the reliability of the PWM timer, but also the reliability of the PWM signal diagnostic unit.

The above diagnostic method can be applied even to the PWM timer 15 according to the first embodiment. For example, a buffer circuit for storing the values of the pulse period register 152 and the pulse width register 154 is provided in the comparator 161 lying in the PWM timer 15. The buffer circuit is capable of access by the CPU 11. When the comparator 161 performs a comparison process, the values of the pulse width and the pulse period stored in the buffer circuit are used as references to perform a diagnosis of the PWM signal 164. Upon the test of the diagnostic function for the PWM signal, the CPU 11 sets the first generation condition to the pulse period register 152 and the pulse period register 153 at Step 105 of FIG. 17. Thereafter, at Step 106, the CPU 11 obtains access to the buffer circuit of the comparator 161 to set the first generation condition and allows the diagnostic process to be carried out. Thereafter, at Step 108, the CPU 11 accesses the buffer circuit again to set the second generation condition and allows the diagnostic process to be performed. Whether the diagnostic function for the PWM signal is normal can be diagnosed by doing so in the PWM timer 15 according to the first embodiment. Even at the PWM signal diagnostic unit 20 according to the second embodiment, whether the diagnostic function for the PWM signal is normal can be diagnosed by a method similar to the above.

Eleventh Embodiment

Figure 18:
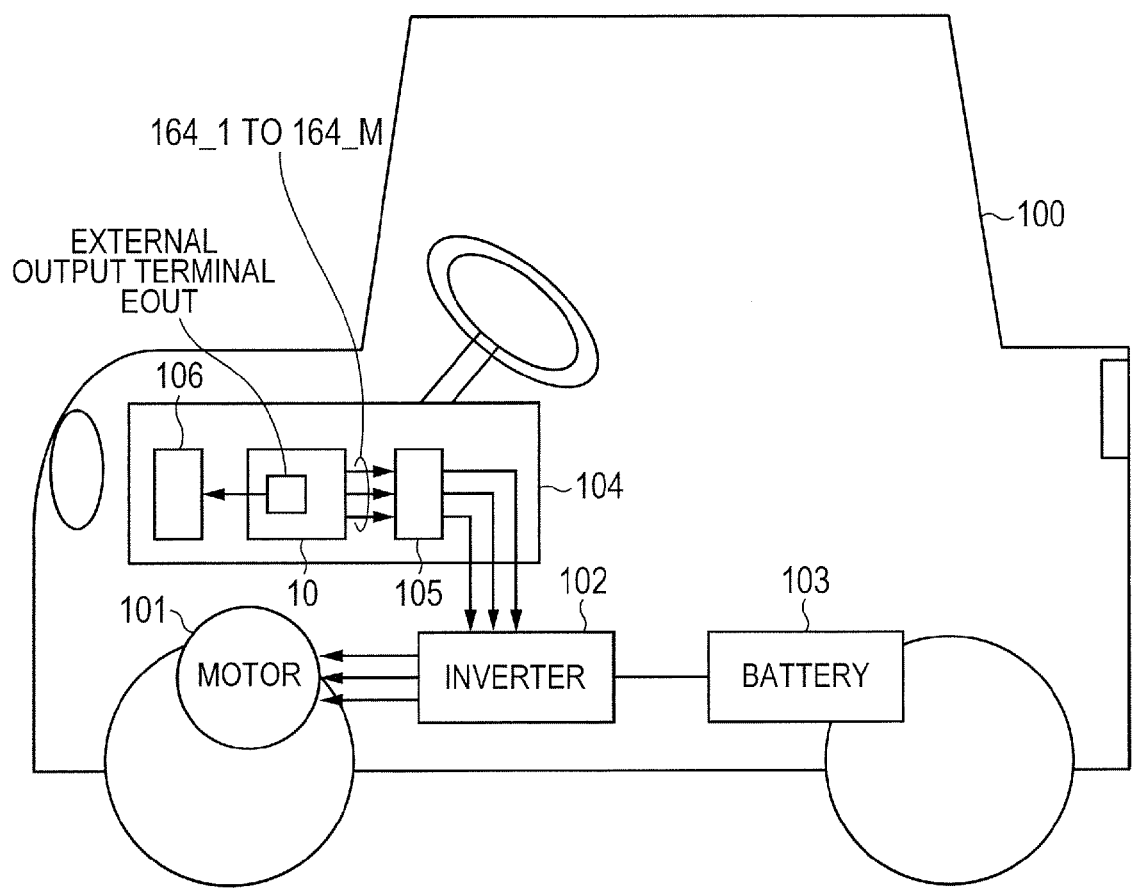
FIG. 18 is a block diagram illustrating one example of an electronic control unit equipped with a microcontroller having a PWM timer function and its diagnostic function.
Figure 19:
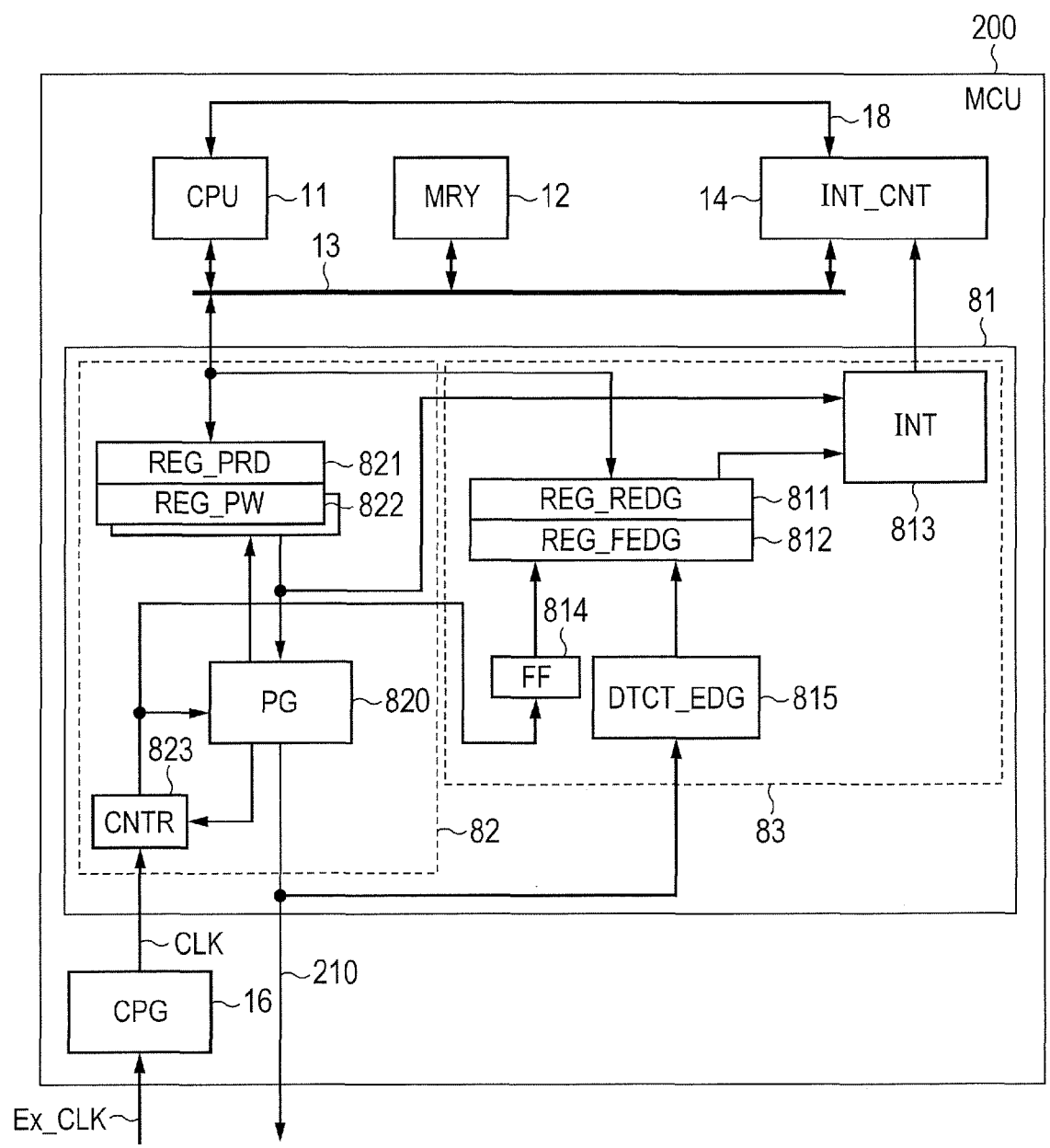
FIG. 19 is a block diagram showing one example of a microcontroller having a diagnostic function of a PWM timer examined by the inventors of the present application prior to the invention.
Figure 20:
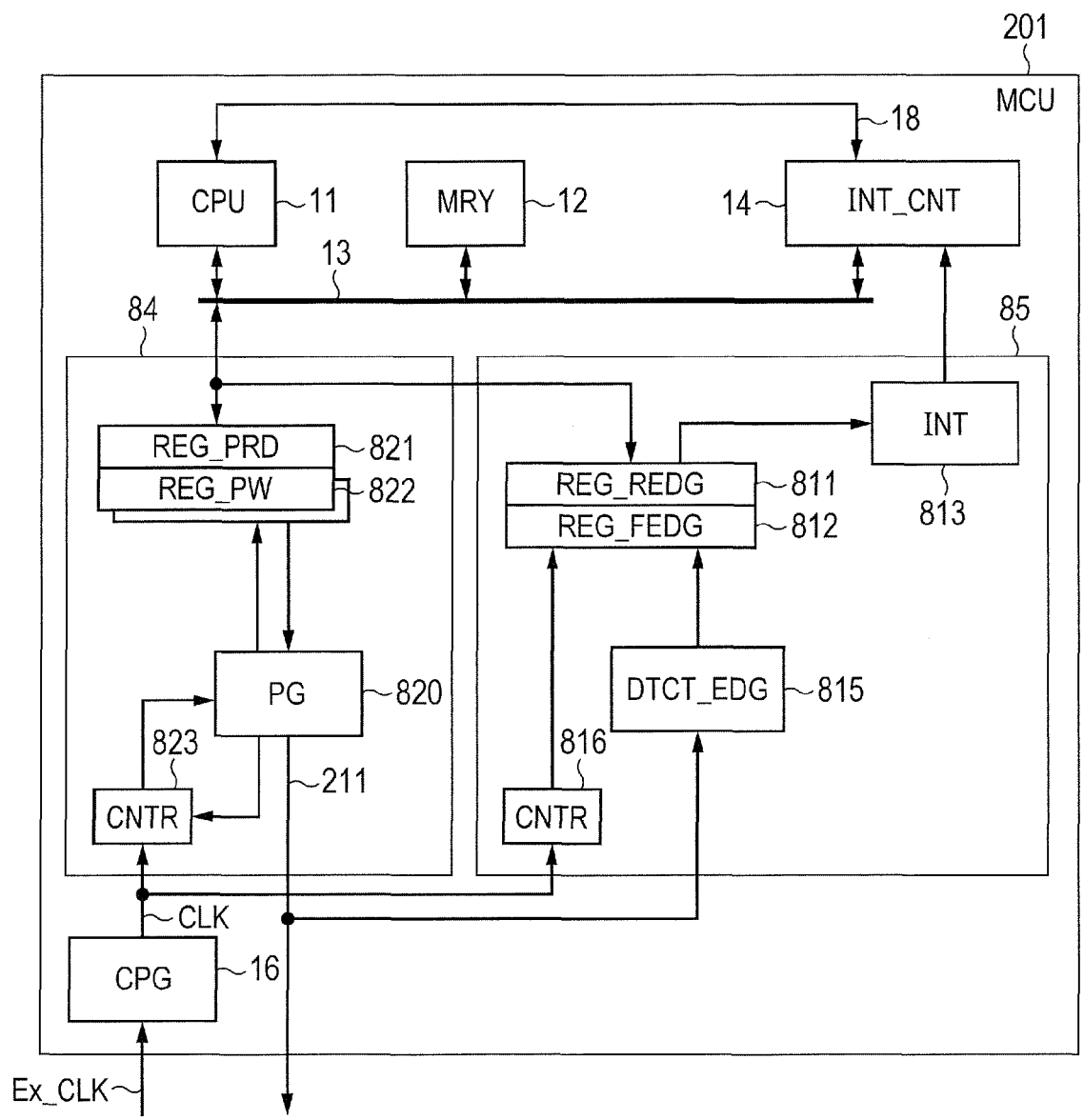
FIG. 20 is a block diagram showing another example of a microcontroller having a diagnostic function of a PWM timer examined by the inventors of the present application prior to the invention.

FIG. 18 is a block diagram illustrating one example of an electronic control unit equipped with a microcontroller having a PWM timer function and its diagnostic function. The electronic control unit 104 shown in the same drawing is of a control device for controlling a power train system of an automobile, for example. The electronic control unit 104 is equipped with, for example, a microcontroller 10, a driver 105 and a safety device 106. The microcontroller 10 is of a control unit for controlling a motor 101 which drives the automobile and is further provided with, for example, an external output terminal EOUT for notifying the result of diagnosis of a PWM signal on the basis of the circuit configuration of any of the microcontrollers 1 through 9 in the first through ninth embodiments. Although FIG. 18 typically shows the case where the microcontroller 7 that outputs a plurality of the PWM signals 164_1 through 164_M is applied, as the circuit configuration of the microcontroller 10, the circuit configuration is not limited to this.

PWM signals 164_1 through 164_M outputted from the microcontroller 10 are inputted the driver 105. The driver 105 is a circuit for driving an inverter 102. The driver 105 amplifies the input PWM signals 164_1 through 164_M and outputs the same to the inverter 102. The inverter 102 drives the motor 101 based on the amplified PWM signals 164_1 through 164_M.

When an abnormality is detected in any of the PWM signals 164_1 through 164_M by the diagnostic function for each PWM signal in the microcontroller 10, the microcontroller 10 outputs an error signal to the safety device 106 through the external output terminal EOUT. The safety device 106 performs a process for preventing an abnormal operation of the motor 101 according to the error signal. The content of the corresponding process depends on the system, but is considered to include, for example, a method for notifying a warning indicative of a failure to a car dashboard or stopping microcontroller control for PWM-signal generation. Even in addition to the above method, there may be adopted, for example, a method of providing a plurality of the microcontrollers 10 having the same function within the electronic control unit 104 and performing switching between the microcontrollers according to an error signal. Described specifically, a plurality of microcontrollers are caused to carry out the same process, and the driver 105 is caused to input PWM signals by one microcontroller. Then, when the error signal is notified, the safety device 106 causes PWM signals from another microcontroller taken instead of the microcontroller having notified the error signal to be input to the driver 105.

Thus, according to the microcontroller 10 according to the tenth embodiment, it is possible to determine whether the PWM signals are generated in accordance with the set pulse period and pulse width. Therefore, a more detailed fault decision is enabled and the safety of motor control can be more enhanced. Since the above diagnosis is achieved by another circuit module different from the CPU, there is no increase in the processing load of the CPU in the microcontroller.

Although the invention made above by the present inventors has been described specifically on the basis of the preferred embodiments, the present invention is not limited to the embodiments referred to above. It is needless to say that various changes can be made thereto within the scope not departing from the gist thereof.

Although the first embodiment has illustrated by way of example the method used to perform the diagnostic process on the count delay value CD_VAL obtained by delaying the value of the counter 157 by the flip-flop circuit 158, for example, the present invention is not limited to it. There may be adopted, for example, a method in which as in the third or fourth embodiment, the counter 172 for the diagnostic process is provided in isolation and its count value is used in the diagnostic process. The counter 172 in this case may be configured by a free running counter or a counter of a type that it is reset every period of a PWM signal.

What is claimed is:

1. A microcontroller comprising:
a central processing unit;
a PWM signal generation unit which generates a PWM signal according to a stored generation condition set by the central processing unit, the stored generation condition being stored in a register; and
a diagnostic unit which detects a pulse period and a pulse width of the PWM signal generated by the PWM signal generation unit and compares the detected pulse period and pulse width with a pulse period and pulse width corresponding to the stored generation condition to thereby perform a diagnosis of the PWM signal generation unit,
wherein when the stored generation condition under which the pulse width of the PWM signal becomes zero is set to the PWM signal generation unit, the diagnostic unit corrects an input PWM signal to be a high level only for a first period shorter than the pulse period for the set stored generation condition and detects a pulse period and a pulse width of the corrected PWM signal to thereby perform the comparison.

2. A microcontroller according to claim 1, wherein when the stored generation condition under which the pulse width and the pulse period of the PWM signal coincide with each other is set to the PWM signal generation unit, the diagnostic unit corrects the input PWM signal to be a low level for only a second period shorter than the pulse period for the set stored generation condition and detects a pulse period and a pulse width of the corrected PWM signal to thereby perform the comparison.

3. A microcontroller according to claim 2,
wherein the diagnostic unit comprises:
a pulse correction unit which corrects the input PWM signal and outputs a corrected PWM signal according to the stored generation condition set to the PWM signal generation unit;
a detection unit which detects rising and falling edges of the signal outputted from the pulse correction unit; and
a comparison unit which calculates a pulse period and pulse width of the signal outputted from the pulse correction unit, based on the detected edges and compares the calculated pulse period and pulse width with the pulse period and pulse width corresponding to the stored generation condition,
wherein when the stored generation condition under which the pulse width of the PWM signal becomes zero is set to the PWM signal generation unit, the pulse correction unit generates a first signal brought to a high level only for the first period with a timing at which a time corresponding to a pulse period has elapsed from a rising edge of the immediately preceding PWM signal and takes a logical ORing of the first signal and the input PWM signal to thereby generate the corrected PWM signal, and
wherein when the stored generation condition under which the pulse width of the PWM signal becomes zero is set to the PWM signal generation unit, the comparison unit determines that the PWM signal corresponding to the stored generation condition has been generated if the calculated pulse period and the pulse period corresponding to the stored generation condition coincide with each other, and the calculated pulse width and the pulse width corresponding to the first period coincide with each other, and determines that the PWM signal corresponding to the stored generation condition has not been generated if the calculated pulse period and the pulse period corresponding to the stored generation condition do not coincide with each other or the calculated pulse width and the pulse width corresponding to the first period do not coincide with each other.

4. A microcontroller according to claim 3,
wherein when the stored generation condition under which the pulse width and the pulse period of the PWM signal coincide with each other, is set to the PWM signal generation unit, the pulse correction unit generates a second signal brought to a high level only for the second period with a timing at which a predetermined period has elapsed from the time when the input PWM signal has risen, and takes a logical ANDing of an inverted signal of the second signal and the input PWM signal to thereby generate the corrected PWM signal, and
wherein when the stored generation condition under which the pulse width and the pulse period of the PWM signal coincide with each other is set to the PWM signal generation unit, the comparison unit determines that a PWM signal corresponding to the stored generation condition has been generated if the calculated pulse period and the pulse period corresponding to the stored generation condition coincide with each other and the calculated pulse width and a pulse width obtained by making the pulse width corresponding to the stored generation condition shortened by the second period coincide with each other, and the comparison unit determines that the PWM signal corresponding to the stored generation condition has not been generated if the calculated pulse period and the pulse period corresponding to the stored generation condition do not coincide with each other or the calculated pulse width and the pulse width shortened by the second period do not coincide with each other.

5. A microcontroller according to claim 2,
wherein the PWM signal generation unit comprises a first register for storing therein the stored generation condition including a pulse period and pulse width,
wherein the diagnostic unit further comprises a second register for storing therein information including the stored generation condition stored in the first register, and
wherein the diagnostic unit performs the determination, based on the stored generation condition stored in the second register.

6. A microcontroller according to claim 5, wherein the diagnostic unit monitors writing of the stored generation condition into the first register by the central processing unit, acquires the stored generation condition to be written by the central processing unit and stores the same in the second register.

7. A microcontroller according to claim 6,
wherein the central processing unit, the PWM signal generation unit and the diagnostic unit are coupled to one another via an internal bus,
wherein the central processing unit outputs an address value indicative of the first register and data related to the stored generation condition onto the internal bus when the stored generation condition is written into the first register, and
wherein the diagnostic unit monitors address values outputted onto the internal bus, and when an outputted address value is found to be the address value indicative of the first register, the diagnostic unit acquires the data related to the stored generation condition outputted onto the internal bus and holds the data in the second register.

8. A microcontroller according to claim 2, further comprising:
a first terminal for outputting the PWM signal generated by the PWM signal generation unit to the outside, and
a second terminal for inputting a signal from outside, and
wherein the diagnostic unit is capable of selecting the PWM signal outputted to the first terminal and the PWM signal inputted via the second terminal as PWM signals for the comparison.

9. A microcontroller according to claim 2, wherein the PWM signal generation unit and the diagnostic unit are configured within a common circuit module.

10. A microcontroller according to claim 2, wherein the PWM signal generation unit and the diagnostic unit are configured as circuit modules separated from each other.

11. A microcontroller according to claim 2, further comprising:
a first bus operated with a first bus clock and to which the central processing unit is coupled,
a second bus operated with a second bus clock different from the first bus clock and to which the PWM signal generation unit and the diagnostic unit are coupled, and
a bus control unit for controlling communications between the first bus and the second bus,
wherein the second bus clock is lower than the first bus clock in frequency.

12. A microcontroller comprising:
a central processing unit;
a PWM signal generation unit which generates a PWM signal according to a stored generation condition set by the central processing unit, the stored generation condition being stored in a register; and
a diagnostic unit which detects a pulse period and a pulse width of the PWM signal generated by the PWM signal generation unit and compares the detected pulse period and pulse width with a pulse period and pulse width corresponding to the stored generation condition to thereby perform a diagnosis of the PWM signal generation unit,
wherein the PWM signal generation unit comprises a plurality of lower PWM signal generation units to generate a plurality of PWM signals different from one another,
wherein said microcontroller further comprises a first selection unit which inputs the PWM signals outputted from the PWM signal generation unit and selects and outputs any of the input PWM signals, and
wherein the diagnostic unit inputs the PWM signal outputted from the first selection unit, detects a pulse period and a pulse width of the input PWM signal, and compares the detected pulse period and pulse width with the pulse period and pulse width corresponding to the stored generation condition.

13. A microcontroller according to claim 12, further comprising:
a plurality of first terminals for outputting the plurality of PWM signals generated by the PWM signal generation unit to the outside of the microcontroller, and
a plurality of second terminals for receiving as input the PWM signals output by the first terminals from outside of the microcontroller,
wherein the first selection unit selects any one of the PWM signals outputted to the first terminals and outputs the same as a first PWM signal, and selects any one of the PWM signals input via the second terminals and outputs the same as a second PWM signal, and
wherein the diagnostic unit is capable of selecting the first PWM signal and the second PWM signal, as PWM signals for the comparison.

14. A microcontroller comprising:
a central processing unit;
a PWM signal generation unit which generates a PWM signal according to a stored generation condition set by the central processing unit, the stored generation condition being stored in a register;
a diagnostic unit which detects a pulse period and a pulse width of the PWM signal generated by the PWM signal generation unit and compares the detected period and pulse width with a pulse period and pulse width corresponding to the stored generation condition to thereby perform a diagnosis of the PWM signal generation unit;
at least one additional diagnostic unit;
a plurality of first terminals for outputting PWM signals generated by the PWM signal generation unit to the outside;
a plurality of second terminals for inputting the PWM signals from outside; and a first selection unit having in association with the diagnostic units, a plurality of selection circuits which respectively input the PWM signals input from the second terminals, select any one of the input PWM signals and output the selected signal to the diagnostic unit, wherein each of the diagnostic units is capable of selecting the PWM signal outputted to a first terminal and the signal selected by the corresponding selection circuit, as PWM signals for the comparison.

15. A microcontroller comprising:

a central processing unit;

a PWM signal generation unit which generates a PWM signal according to a stored generation condition set by the central processing unit, the stored generation condition being stored in a register; and a diagnostic unit which detects a pulse period and a pulse width of the PWM signal generated by the PWM signal generation unit and compares the detected pulse period and pulse width with a pulse period and pulse width corresponding to the stored generation condition to thereby perform a diagnosis of the PWM signal generation unit, wherein the PWM signal generation unit comprises m lower PWM signal generation parts to generate m (where m: integer greater than or equal to 2) PWM signals different from one another, wherein said microcontroller further comprises a first selection unit which inputs the PWM signals outputted from the PWM signal generation unit and selects and outputs any of the input PWM signals, and wherein the diagnostic unit comprises n (where n: integer greater than or equal to 1) lower diagnostic units each of which inputs a PWM signal outputted from the first selection unit therein and detects a pulse period and a pulse width of the input PWM signal, and each of which compares the detected pulse period and pulse width with the pulse period and pulse width corresponding to the stored generation condition.

16. A microcontroller according to claim 15, further comprising:

m first terminals for respectively outputting the generated m PWM signals to the outside, and a plurality of second terminals for respectively receiving the PWM signals input to the first selection unit from outside, wherein the first selection unit comprises, in association with the lower diagnostic units, n selection circuits each of which selects any one of the m PWM signals outputted to the first terminals and outputs the same to the associated lower diagnostic unit as a first PWM signal, and selects any one of the PWM signals input via the second terminals and outputs the same as a second PWM signal to the associated lower diagnostic unit, and wherein each of the lower diagnostic units is capable of selecting the first PWM signal and the second PWM signal as PWM signals for the comparison.

17. A control device for controlling a motor, comprising:

a microcontroller which generates a PWM signal for driving the motor and outputs an error signal from an external terminal where the generated PWM signal is abnormal;

a driver for driving the motor, based on the generated PWM signal; and a safety device which performs a process for preventing an abnormal operation of the motor in response to the error signal, wherein the microcontroller comprises:

a central processing unit;

a PWM signal generation unit which generates the PWM signal according to a generation condition set by the central processing unit; and a diagnostic unit which inputs the generated PWM signal and detects a pulse period and a pulse width thereof, and which determines whether the detected pulse period and pulse width coincide with a pulse period and a pulse width corresponding to the generation condition, wherein the error signal is outputted by the microcontroller to the external terminal according to a result of the determination.

18. A determination method for determining whether a diagnostic unit of a microcomputer is normal, said determination method comprising:

providing the microcomputer comprising a PWM signal generation unit that generates a PWM signal according to a set generation condition, and the diagnostic unit that determines whether the PWM signal generated by the PWM signal generation unit is of a signal having a pulse period and a pulse width corresponding to a set diagnostic generation condition;

setting a condition equivalent to the generation condition set to the PWM signal generation unit to the diagnostic unit, determining that the diagnostic unit is normal when the diagnostic unit determines that the generated PWM signal coincides with PWM signal parameters corresponding to the equivalent condition, and determining that the diagnostic unit is abnormal when the two are determined not to coincide with each other; and setting a condition different from the generation condition set to the PWM signal generation unit to the diagnostic unit, determining that the diagnostic unit is abnormal when the generated PWM signal coincides with PWM signal parameters corresponding to the different condition, and determining that the diagnostic unit is normal when the two are determined not to coincide with each other.

* * * * *